(12) United States Patent
Koganti

(10) Patent No.: US 9,154,416 B2
(45) Date of Patent: Oct. 6, 2015

(54) OVERLAY TUNNEL IN A FABRIC SWITCH

(71) Applicant: BROCADE COMMUNICATIONS SYSTEMS, INC., San Jose, CA (US)

(72) Inventor: Phanidhar Koganti, Hyderabad (IN)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 249 days.

(21) Appl. No.: 13/801,858

(22) Filed: Mar. 13, 2013

(65) Prior Publication Data

US 2013/0250951 A1    Sep. 26, 2013

Related U.S. Application Data

(60) Provisional application No. 61/614,392, filed on Mar. 22, 2012.

(51) Int. Cl.
*H04L 12/741* (2013.01)
*H04L 12/931* (2013.01)
*H04L 12/713* (2013.01)

(52) U.S. Cl.
CPC .............. *H04L 45/74* (2013.01); *H04L 45/586* (2013.01); *H04L 49/356* (2013.01); *H04L 49/70* (2013.01)

(58) Field of Classification Search
CPC ..... H04L 45/74; H04L 45/586; H04L 49/356; H04L 49/70; H04L 49/65
USPC .................. 370/351, 357, 360, 389, 390, 392, 370/395.1, 398, 400, 409, 464, 474
See application file for complete search history.

(56) References Cited

U.S. PATENT DOCUMENTS

| | | | |
|---|---|---|---|
| 5,390,173 | A | 2/1995 | Spinney |
| 5,802,278 | A | 9/1998 | Isfeld |
| 5,878,232 | A | 3/1999 | Marimuthu |
| 5,959,968 | A | 9/1999 | Chin |
| 5,973,278 | A | 10/1999 | Wehrill, III |

(Continued)

FOREIGN PATENT DOCUMENTS

| | | |
|---|---|---|
| CN | 102801599 | 11/2012 |
| EP | 0579567 | 5/1993 |

(Continued)

OTHER PUBLICATIONS

"Switched Virtual Internetworking Moves Beyond Bridges and Routers", pp. 66-70, 72, 74, 76, 78, 80, Data Communications, Sep. 1994, No. 12, New York, US.

(Continued)

*Primary Examiner* — Obaidul Huq
(74) *Attorney, Agent, or Firm* — Shun Yao; Park, Vaughan, Fleming & Dowler LLP

(57) ABSTRACT

One embodiment of the present invention provides a switch. The switch includes a tunnel management module, a packet processor, and a forwarding module. The tunnel management module operates the switch as a tunnel gateway capable of terminating an overlay tunnel. During operation, the packet processor, which is coupled to the tunnel management module, identifies in a data packet a virtual Internet Protocol (IP) address associated with a virtual tunnel gateway. This virtual tunnel gateway is associated with the switch and the data packet is associated with the overlay tunnel. The forwarding module determines an output port for an inner packet in the data packet based on a destination address of the inner packet.

22 Claims, 11 Drawing Sheets

(56) References Cited

U.S. PATENT DOCUMENTS

| | | |
|---|---|---|
| 5,983,278 A | 11/1999 | Chong |
| 6,041,042 A | 3/2000 | Bussiere |
| 6,085,238 A | 7/2000 | Yuasa |
| 6,104,696 A | 8/2000 | Kadambi |
| 6,185,214 B1 | 2/2001 | Schwartz |
| 6,185,241 B1 | 2/2001 | Sun |
| 6,438,106 B1 | 8/2002 | Pillar |
| 6,542,266 B1 | 4/2003 | Phillips |
| 6,633,761 B1 | 10/2003 | Singhal |
| 6,771,610 B1 | 8/2004 | Seaman |
| 6,873,602 B1 | 3/2005 | Ambe |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,924,837 B1 | 4/2011 | Shabtay |
| 7,937,756 B2 | 5/2011 | Kay |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake, III |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | Jha |
| 8,599,864 B2 | 12/2013 | Chung |
| 8,615,008 B2 | 12/2013 | Natarajan |
| 8,826,385 B2 | 9/2014 | Congdon |
| 2001/0055274 A1 | 12/2001 | Hegge |
| 2002/0019904 A1 | 2/2002 | Katz |
| 2002/0021701 A1 | 2/2002 | Lavian |
| 2002/0091795 A1 | 7/2002 | Yip |
| 2003/0041085 A1 | 2/2003 | Sato |
| 2003/0123393 A1 | 7/2003 | Feuerstraeter |
| 2003/0174706 A1 | 9/2003 | Shankar |
| 2003/0189905 A1 | 10/2003 | Lee |
| 2004/0001433 A1 | 1/2004 | Gram |
| 2004/0010600 A1 | 1/2004 | Baldwin |
| 2004/0049699 A1 | 3/2004 | Griffith |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0213232 A1 | 10/2004 | Regan |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0122979 A1 | 6/2005 | Gross |
| 2005/0157645 A1 | 7/2005 | Rabie |
| 2005/0157751 A1 | 7/2005 | Rabie |
| 2005/0169188 A1 | 8/2005 | Cometto |
| 2005/0195813 A1 | 9/2005 | Ambe |
| 2005/0213561 A1 | 9/2005 | Yao |
| 2005/0220096 A1 | 10/2005 | Friskney |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0034292 A1 | 2/2006 | Wakayama |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0098589 A1 | 5/2006 | Kreeger |
| 2006/0168109 A1 | 7/2006 | Warmenhoven |
| 2006/0184937 A1 | 8/2006 | Abels |
| 2006/0221960 A1 | 10/2006 | Borgione |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2007/0036178 A1 | 2/2007 | Hares |
| 2007/0086362 A1 | 4/2007 | Kato |
| 2007/0094464 A1 | 4/2007 | Sharma |
| 2007/0097968 A1 | 5/2007 | Du |
| 2007/0116224 A1 | 5/2007 | Burke |
| 2007/0116422 A1 | 5/2007 | Reynolds |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0211712 A1 | 9/2007 | Fitch |
| 2007/0274234 A1 | 11/2007 | Kubota |

(56) References Cited

U.S. PATENT DOCUMENTS

| | | |
|---|---|---|
| 2007/0289017 A1 | 12/2007 | Copeland, III |
| 2008/0052487 A1 | 2/2008 | Akahane |
| 2008/0065760 A1 | 3/2008 | Damm |
| 2008/0080517 A1 | 4/2008 | Roy et al. |
| 2008/0101386 A1 | 5/2008 | Gray |
| 2008/0112400 A1 | 5/2008 | Dunbar et al. |
| 2008/0133760 A1 | 6/2008 | Berkvens et al. |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285555 A1 | 11/2008 | Ogasahara |
| 2008/0298248 A1 | 12/2008 | Roeck |
| 2008/0310342 A1 | 12/2008 | Kruys |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138577 A1 | 5/2009 | Casado |
| 2009/0138752 A1 | 5/2009 | Graham |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0245137 A1 | 10/2009 | Hares |
| 2009/0245242 A1 | 10/2009 | Carlson |
| 2009/0246137 A1 | 10/2009 | Hadida |
| 2009/0252049 A1 | 10/2009 | Ludwig |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323708 A1 | 12/2009 | Ihle |
| 2009/0327392 A1 | 12/2009 | Tripathi |
| 2009/0327462 A1 | 12/2009 | Adams |
| 2010/0027420 A1 | 2/2010 | Smith |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0257263 A1 | 10/2010 | Casado |
| 2010/0271960 A1 | 10/2010 | Krygowski |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0055274 A1 | 3/2011 | Scales et al. |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe |
| 2011/0142062 A1 | 6/2011 | Wang |
| 2011/0161494 A1 | 6/2011 | McDysan |
| 2011/0161695 A1 | 6/2011 | Okita |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0273988 A1 | 11/2011 | Tourrilhes |
| 2011/0274114 A1 | 11/2011 | Dhar |
| 2011/0280572 A1 | 11/2011 | Vobbilisetty |
| 2011/0286457 A1 | 11/2011 | Ee |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1* | 1/2012 | Dunbar et al. ........... 370/395.53 |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob Da Silva |
| 2012/0033669 A1 | 2/2012 | Mohandas |
| 2012/0075991 A1 | 3/2012 | Sugita |
| 2012/0099602 A1 | 4/2012 | Nagapudi |
| 2012/0106339 A1 | 5/2012 | Mishra |
| 2012/0131097 A1 | 5/2012 | Baykal |
| 2012/0131289 A1 | 5/2012 | Taguchi |

(56) References Cited

U.S. PATENT DOCUMENTS

| | | |
|---|---|---|
| 2012/0158997 A1 | 6/2012 | Hsu |
| 2012/0163164 A1 | 6/2012 | Terry |
| 2012/0177039 A1 | 7/2012 | Berman |
| 2012/0243539 A1 | 9/2012 | Keesara |
| 2012/0275347 A1 | 11/2012 | Banerjee |
| 2012/0294192 A1 | 11/2012 | Masood |
| 2012/0294194 A1 | 11/2012 | Balasubramanian |
| 2012/0320749 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003737 A1 | 1/2013 | Sinicrope |
| 2013/0028072 A1 | 1/2013 | Addanki |
| 2013/0034015 A1 | 2/2013 | Jaiswal |
| 2013/0044629 A1* | 2/2013 | Biswas et al. ............. 370/254 |
| 2013/0067466 A1 | 3/2013 | Combs |
| 2013/0070762 A1 | 3/2013 | Adams |
| 2013/0114595 A1 | 5/2013 | Mack-Crane et al. |
| 2013/0124750 A1* | 5/2013 | Anumala et al. ............. 709/232 |
| 2013/0127848 A1 | 5/2013 | Joshi |
| 2013/0194914 A1 | 8/2013 | Agarwal |
| 2013/0201986 A1* | 8/2013 | Sajassi et al. ............. 370/390 |
| 2013/0219473 A1 | 8/2013 | Schaefer |
| 2013/0250951 A1 | 9/2013 | Koganti |
| 2013/0259037 A1 | 10/2013 | Natarajan |
| 2013/0272135 A1 | 10/2013 | Leong |
| 2014/0105034 A1 | 4/2014 | Sun |

FOREIGN PATENT DOCUMENTS

| | | |
|---|---|---|
| EP | 1398920 A2 | 3/2004 |
| EP | 2001167 A1 | 8/2007 |
| EP | 1916807 A2 | 10/2007 |
| WO | 2009042919 | 4/2009 |
| WO | 2010111142 A1 | 9/2010 |
| WO | 2014031781 | 2/2014 |

OTHER PUBLICATIONS

Perlman, Radia et al., "RBridge VLAN Mapping", <draft-ietf-trill-rbridge-vlan-mapping-01.txt>, Dec. 4, 2009, Trill Working Group.
Perlman, Radia, et al., "RBridges: Base Protocol Specification", <draft-ietf-trill-rbridge-protocol-16.txt>, Mar. 3, 2010.
S. Nadas et al., "Virtual Router Redundancy Protocol (VRRP) Version 3 for IPv4 and IPv6", Mar. 2010.
Lapuh, Roger et al., "Split Multi-Link Trunking (SMLT)", Network Working Group, Oct. 2012.
Knight, S. et al., "Virtual Router Redundancy Protocol", Network Working Group, Apr. 1998.
Eastlake 3rd, Donald et al., "RBridges: TRILL Header Options", <draft-ietf-trill-rbridge-options-00.txt>, TRILL Working Group, Dec. 24, 2009.
Christensen, M. et al., "Considereations for Internet Group Management Protocol (IGMP) and Multicast Listener Discovery (MLD) Snooping Switches", May 2006.
Touch, J. et al., "Transparent Interconnection of Lots of Links (TRILL): Problem and Applicability Statement", May 2009.
Knight, Paul et al., "Network based IP VPN Architecture using Virtual Routers", May 2003.
Kreeger, L. et al. "Network Virtualization Overlay Control Protocol Requirements draft-Kreeger-nvo3-overlay-cp-00", Aug. 2, 2012.
An Introduction to Brocade VCS Fabric Technology, Dec. 3, 2012.
Narten, T. et al. "Problem Statement: Overlays for Network Virtualization draft-narten-nvo3-overlay-problem-statement-01", Oct. 31, 2011.
Office Action for U.S. Appl. No. 12/725,249, filed Mar. 16, 2010, dated Sep. 12, 2012.
Office Action for U.S. Appl. No. 12/725,249, filed Mar. 16, 2010, dated Apr. 26, 2013.
Office Action for U.S. Appl. No. 13/087,239, filed Apr. 14, 2011, dated May 22, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,580, filed Apr. 22, 2011, dated Jun. 10, 2013.
Office Action for U.S. Appl. No. 13/042,259, filed Mar. 7, 2011, dated Mar. 18, 2013.
Office Action for U.S. Appl. No. 13/092,460, filed Apr. 22, 2011, dated Jun. 21, 2013.
Office Action for U.S. Appl. No. 13/042,259, filed Mar. 7, 2011, dated Jul. 31, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,752, filed Apr. 22, 2011, dated Feb. 5, 2013.
Office Action for U.S. Appl. No. 13/092,752, filed Apr. 22, 2011, dated Jul. 18, 2013.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 12/950,968, filed Nov. 19, 2010, dated Jun. 7, 2012.
Office Action for U.S. Appl. No. 12/950,968, filed Nov. 19, 2010, dated Jan. 4, 2013.
Office Action for U.S. Appl. No. 13/092,864, filed Apr. 22, 2011, dated Sep. 19, 2012.
Office Action for U.S. Appl. No. 13/098,360, filed Apr. 29, 2011, dated May 31, 2013.
Office Action for U.S. Appl. No. 13/044,326, filed Mar. 9, 2011, dated Oct. 2, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/030,688, filed Feb. 18, 2011, dated Apr. 25, 2013.
Office Action for U.S. Appl. No. 13/044,301, filed Mar. 9, 2011, dated Jun. 11, 2013.
Office Action for U.S. Appl. No. 13/044,301, filed Mar. 9, 2011, dated Feb. 22, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/184,526, filed Jul. 16, 2011, dated Jan. 28, 2013.
Office Action for U.S. Appl. No. 13/184,526, filed May 22, 2013, dated May 22, 2013.
Office Action for U.S. Appl. No. 13/092,873, filed Apr. 22, 2011, dated Jun. 19, 2013.
Office Action for U.S. Appl. No. 13/365,993, filed Feb. 3, 2012, dated Jul. 23, 2013.
Office Action for U.S. Appl. No. 13/365,808, filed Feb. 3, 2012, dated Jul. 18, 2013.
Office Action for U.S. Appl. No. 13/312,903, filed Dec. 6, 2011, dated Jun. 13, 2013.
Office Action for U.S. Appl. No. 13/598,204, filed Aug. 29, 2012, dated Feb. 20, 2014.
Office Action for U.S. Appl. No. 13/533,843, filed Jun. 26, 2012, dated Oct. 21, 2013.

(56) References Cited

OTHER PUBLICATIONS

Office Action for U.S. Appl. No. 13/351,513, filed Jan. 17, 2012, dated Feb. 28, 2014.
Office Action for U.S. Appl. No. 13/312,903, filed Dec. 6, 2011, dated Nov. 12, 2013.
Office Action for U.S. Appl. No. 13/092,873, filed Apr. 22, 2011, dated Nov. 29, 2013.
Office Action for U.S. Appl. No. 13/194,526, filed Jul. 16, 2011, dated Dec. 2, 2013.
Office Action for U.S. Appl. No. 13/092,460, filed Apr. 22, 2011, dated Mar. 14, 2014.
Office Action for U.S. Appl. No. 13/042,259, filed Mar. 7, 2011, dated Jan. 16, 2014.
Office Action for U.S. Appl. No. 13/092,580, filed Apr. 22, 2011, dated Jan. 10, 2014.
Office Action for U.S. Appl. No. 13/092,877, filed Apr. 22, 2011, dated Jan. 6, 2014.
Office Action for U.S. Appl. No. 13/092,701, filed Apr. 22, 2011, dated Mar. 26, 2014.
Office Action for U.S. Appl. No. 13/092,724, filed Apr. 22, 2011, dated Apr. 9, 2014.
Office Action for U.S. Appl. No. 13/098,490, filed May 2, 2011, dated Mar. 27, 2014.
Zhai F. Hu et al. "RBridge: Pseudo-Nickname; draft-hu-trill-pseudonode-nickname-02.txt", May 15, 2012.
Huang, Nen-Fu et al., "An Effective Spanning Tree Algorithm for a Bridged LAN", Mar. 16, 1992.
Office Action dated Jun. 6, 2014, U.S. Appl. No. 13/669,357, filed Nov. 5, 2012.
Office Action dated Feb. 20, 2014, U.S. Appl. No. 13/598,204, filed Aug. 29, 2012.
Office Action dated May 14, 2014, U.S. Appl. No. 13/533,843, filed Jun. 26, 2012.
Office Action dated May 9, 2014, U.S. Appl. No. 13/484,072, filed May 30, 2012.
Office Action dated Feb. 28, 2014, U.S. Appl. No. 13/351,513, filed Jan. 17, 2012.
Office Action dated Jun. 18, 2014, U.S. Appl. No. 13/440,861, filed Apr. 5, 2012.
Office Action dated Mar. 6, 2014, U.S. Appl. No. 13/425,238, filed Mar. 20, 2012.
Office Action dated Jun. 20, 2014, U.S. Appl. No. 13/092,877, filed Apr. 22, 2011.
Office Action dated Apr. 9, 2014, U.S. Appl. No. 13/092,751, filed Apr. 22, 2011.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action for U.S. Appl. No. 13/425,238, filed Mar. 20, 2012, dated Mar. 12, 2015.
Office Action for U.S. Appl. No. 13/786,328, filed Mar. 5, 2013, dated Mar. 13, 2015.
Office Action for U.S. Appl. No. 14/577,785, filed Dec. 19, 2014, dated Apr. 13, 2015.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Zhai F. Hu et al. 'RBridge: Pseudo-Nickname; draft-hu-trill-pseudonode-nickname-02.txt', May 15, 2012.
'RBridges: Base Protocol Specification', IETF Draft, Perlman et al., Jun. 26, 2009.
Lapuh, Roger et al., 'Split Multi-link Trunking (SMLT) draft-lapuh-network-smlt-08', Jan. 2009.
'An Introduction to Brocade VCS Fabric Technology', BROCADE white paper, http://community.brocade.com/docs/DOC-2954, Dec. 3, 2012.
U.S. Appl. No. 13/030,806 Office Action dated Dec. 3, 2012.
Office action dated Jan. 10, 2014, U.S. Appl. No. 13/092,580, filed Apr. 22, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office action dated Jan. 6, 2014, U.S. Appl. No. 13/092,877, filed Apr. 22, 2011.
Office action dated Oct. 2, 2013, U.S. Appl. No. 13/044,326, filed Mar. 9, 2011.
Office action dated Dec. 2, 2013, U.S. Appl. No. 13/184,526, filed Jul. 16, 2011.
Office action dated Nov. 29, 2013, U.S. Appl. No. 13/092,873, filed Apr. 22, 2011.
Office action dated Nov. 12, 2013, U.S. Appl. No. 13/312,903, filed Dec. 6, 2011.
BROCADE 'Brocade Unveils' The Effortless Network, http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Office Action for U.S. Appl. No. 13/365,993, filed Feb. 3, 2012, from Cho, Hong Sol., dated Jul. 23, 2013.
Office Action for U.S. Appl. No. 13/365,808, filed Jul. 18, 2013, dated Jul. 18, 2013.
Office Action for U.S. Appl. No. 13/092,887, dated Jan. 6, 2014.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.

(56) References Cited

OTHER PUBLICATIONS

Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 13/087,239, filed Apr. 14, 2011, dated Dec. 5, 2012.
Office Action for U.S. Appl. No. 13/351,513, filed Jan. 17, 2012.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009, pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Rosen, E. et al., "BGP/MPLS VPNs", Mar. 1999.
Office Action dated 06/18/215, U.S. Appl. No. 13/098,490, filed May 2, 2011.
Office Action dated Jun. 16, 2015, U.S. Appl. No. 13/048,817, filed Mar. 15, 2011.

* cited by examiner

OVERLAY TUNNEL IN A FABRIC SWITCH

RELATED APPLICATIONS

This application claims the benefit of U.S. Provisional Application No. 61/614,392, titled "Overlay L2/L3 Fabric Architecture," by inventor Phanidhar Koganti, filed 22 Mar. 2012, the disclosure of which is incorporated by reference herein.

The present disclosure is related to:
U.S. patent application Ser. No. 13/087,239, titled "Virtual Cluster Switching," by inventors Suresh Vobbilisetty and Dilip Chatwani, filed 14 Apr. 2011;
U.S. Patent Publication No. 2010/0246388, titled "Redundant Host Connection in a Routed Network," by inventors Somesh Gupta, Anoop Ghanwani, Phanidhar Koganti, and Shunjia Yu, filed 16 Mar. 2010;
U.S. patent application Ser. No. 13/312,903, titled "Layer-3 Support in TRILL Networks," by inventors Phanidhar Koganti, Anoop Ghanwani, Suresh Vobbilisetty, Rajiv Krishnamurthy, Nagarajan Venkatesan, and Shunjia Yu, filed 6 Dec. 2011; and
U.S. patent application Ser. No. 13/092,752, titled "Name Services for Virtual Cluster Switching," by inventors Suresh Vobbilisetty, Phanidhar Koganti, and Jesse B. Willeke, filed 22 Apr. 2011;
the disclosures of which are incorporated by reference herein.

BACKGROUND

1. Field

The present disclosure relates to network management. More specifically, the present disclosure relates to dynamic insertion of services in a fabric switch.

2. Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as awareness of virtual machine migration, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

As Internet traffic is becoming more diverse, virtual computing in a network is becoming progressively more important as a value proposition for network architects. In addition, the evolution of virtual computing has placed additional requirements on the network. For example, as the locations of virtual servers become more mobile and dynamic, it is often desirable that the network infrastructure can provide network overlay tunnels to assist the location changes of the virtual servers.

While a fabric switch brings many desirable features to a network, some issues remain unsolved in facilitating network overlay tunnels to support virtual machine migration.

SUMMARY

One embodiment of the present invention provides a switch. The switch includes a tunnel management module, a packet processor, and a forwarding module. The tunnel management module operates the switch as a tunnel gateway capable of terminating an overlay tunnel. During operation, the packet processor, which is coupled to the tunnel management module, identifies in a data packet a virtual Internet Protocol (IP) address associated with a virtual tunnel gateway. This virtual tunnel gateway is associated with the switch and the data packet is associated with the overlay tunnel. The forwarding module determines an output port for an inner packet in the data packet based on a destination address of the inner packet.

In a variation on this embodiment, a hypervisor controlling one or more virtual machines initiates the overlay tunnel by encapsulating the inner packet.

In a variation on this embodiment, the packet processor also identifies in the data packet a virtual media access control (MAC) address mapped to the virtual IP address.

In a variation on this embodiment, the switch also includes a device management module which operates in conjunction with the packet processor and generates for a hypervisor a configuration message comprising the virtual IP address as a tunnel gateway address.

In a further variation, the virtual IP address in the configuration message also corresponds to a default gateway router.

In a variation on this embodiment, the virtual IP address is further associated with a remote switch. This remote switch also operates as a tunnel gateway and is associated with the virtual tunnel gateway.

In a variation on this embodiment, the data packet is encapsulated based on the Transparent Interconnection of Lots of Links (TRILL) protocol. Under such a scenario, the packet processor also identifies a virtual routing bridge (RBridge) identifier, which is associated with the switch, in the data packet.

In a variation on this embodiment, the switch also includes a fabric switch management module which maintains a membership in a fabric switch. Such a fabric switch accommodates a plurality of switches and operates as a single logical switch.

In a further variation, the packet processor identifies the inner packet to be a broadcast, unknown unicast, or multicast packet. In response, the tunnel management module selects a multicast tree in the fabric switch to distribute the inner packet based on one or more of: multicast group membership, virtual local area network (VLAN) membership, and network load.

In a variation on this embodiment, the tunnel management module operates in conjunction with the packet processor to learn a MAC address of a virtual machine via a tunnel initiated by a first hypervisor associated with the virtual machine.

In a further variation, the tunnel management module operates in conjunction with the packet processor to construct a message for a second hypervisor comprising an IP address of the first hypervisor in response to receiving a data frame with unknown destination from a virtual machine associated with the second hypervisor.

BRIEF DESCRIPTION OF THE FIGURES

In the figures, like reference numerals refer to the same figure elements.

DETAILED DESCRIPTION

Figure 1A:
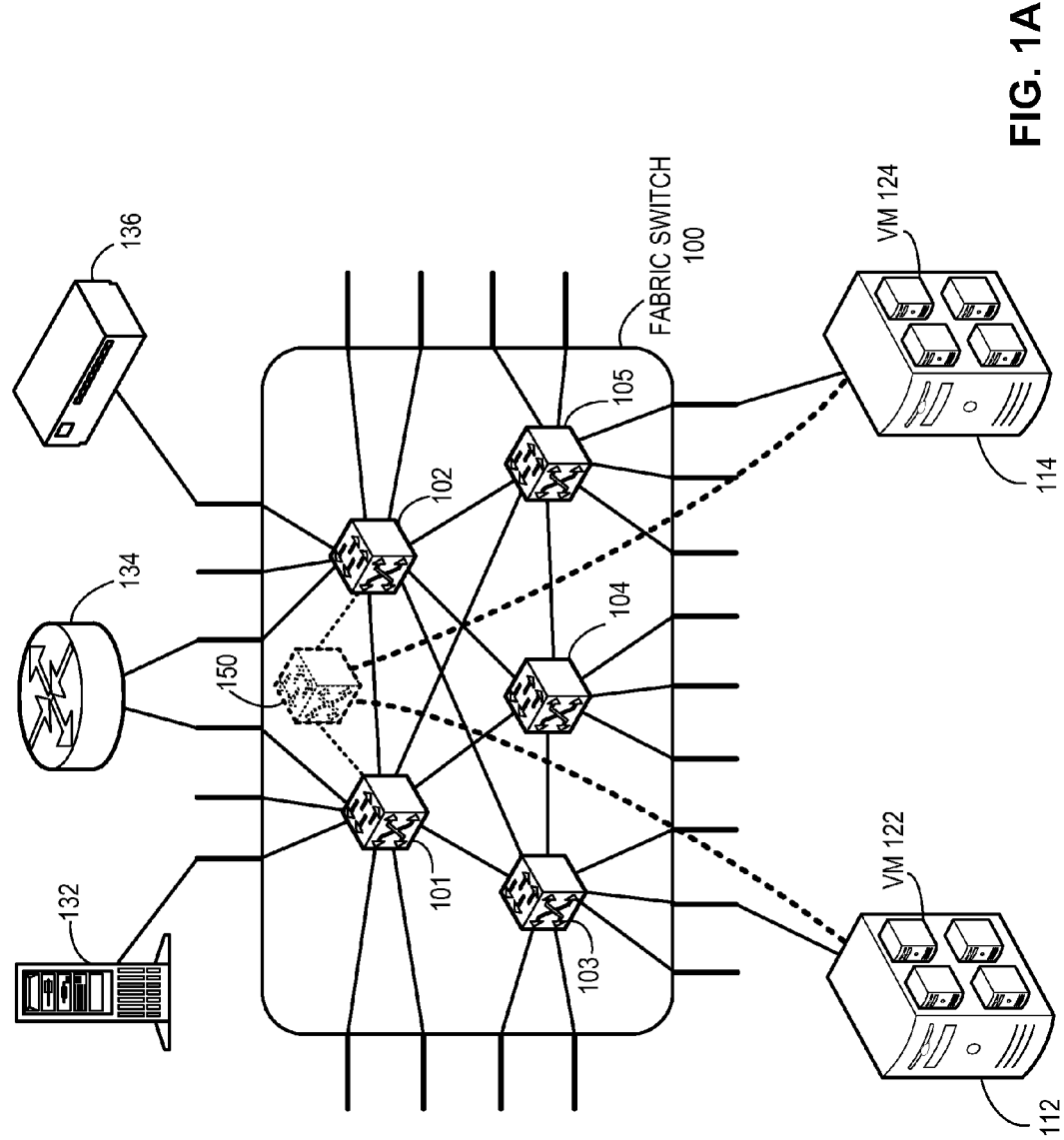
FIG. 1A illustrates an exemplary fabric switch with a virtual tunnel gateway, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of facilitating overlay tunneling in a fabric switch is solved by operating one or more member switches of the fabric switch as tunnel gateways (which can be referred to as member tunnel gateways) virtualized as one virtual tunnel gateway. To achieve high utilization of network devices (e.g., servers and switches), a hypervisor often requires communication to physical and virtual devices which are external to its VLAN and cannot establish a tunnel with the hypervisor. For example, a default router of a network may support a different tunneling technology or may not support tunneling. A tunnel gateway allows the hypervisor to communicate beyond its VLAN boundaries without requiring any tunnel support from the desired destination. Whenever a hypervisor requires communication beyond its VLAN boundaries, the hypervisor initiates and establishes an overlay tunnel with the tunnel gateway, which in turn communicates with the desired destination.

Because a large number of hypervisors can be associated with a single network, the tunnel gateway of the network can become a bottleneck. To reduce the bottleneck, the network can include multiple tunnel gateways. Consequently, a respective hypervisor requires configurations to establish association with a tunnel gateway. For example, if the network has three tunnel gateways, a respective hypervisor is configured to associate with one of the three tunnel gateways. Furthermore, if the number of hypervisors increases, the existing tunnel gateways can again become a bottleneck. When an additional tunnel gateway is added to the network to reduce the bottleneck, the hypervisors require reconfigurations. Similarly, when a tunnel gateway fails, the hypervisors associated with the failed tunnel gateway need to be reassigned to the existing tunnel gateways. Such configurations and reconfigurations can be tedious, repetitious, and error-prone.

To solve this problem, the member switches, which are member tunnel gateways in a fabric switch, present the entire fabric switch as one single logical tunnel gateway to the local hypervisors. The member tunnel gateways are virtualized as a virtual member switch and a virtual member tunnel gateway. Other member switches, which are not member tunnel gateways, consider the virtual gateway switch as another member switch coupled to the member tunnel gateways. At the same time, the local hypervisors consider the virtual member tunnel gateway as a local tunnel gateway. The virtual member tunnel gateway is associated with a virtual Internet Protocol (IP) address and a virtual Media Access Control (MAC) address. A respective member tunnel gateway considers these virtual addresses as local addresses.

A respective hypervisor coupled to the fabric switch is dynamically configured to consider the virtual member tunnel gateway as the tunnel gateway for the hypervisor. This allows the whole fabric switch to act as a distributed tunnel gateway. As a result, the hypervisor can establish an overlay tunnel with any of the member tunnel gateways in the fabric switch associated with the virtual member tunnel gateway; and a member tunnel gateway can be dynamically added to or removed from the fabric switch without reconfiguring the local hypervisors. In this way, the fabric switch with a virtual tunnel gateway supports a large number of tunnels in a scalable way.

In some embodiments, the fabric switch is an Ethernet fabric switch. In an Ethernet fabric switch, any number of switches coupled in an arbitrary topology may logically operate as a single switch. Any new switch may join or leave the fabric switch in "plug-and-play" mode without any manual configuration. A fabric switch appears as a single logical switch to an external device. In some further embodiments, the fabric switch is a Transparent Interconnection of Lots of Links (TRILL) network and a respective member switch of the fabric switch is a TRILL routing bridge (RBridge).

Although the present disclosure is presented using examples based on the TRILL protocol, embodiments of the present invention are not limited to networks defined using TRILL, or a particular Open System Interconnection Reference Model (OSI reference model) layer. For example, embodiments of the present invention can also be applied to a multi-protocol label switching (MPLS) network. In this disclosure, the term "fabric switch" is used in a generic sense, and can refer to a network operating in any networking layer, sub-layer, or a combination of networking layers.

The term "external device" can refer to a device coupled to a fabric switch. An external device can be a host, a server, a conventional layer-2 switch, a layer-3 router, or any other type of device. Additionally, an external device can be coupled to other switches or hosts further away from a network. An external device can also be an aggregation point for a number of network devices to enter the network. The terms "device" and "machine" are used interchangeably.

The term "hypervisor" is used in a generic sense, and can refer to any virtual machine manager. Any software, firmware, or hardware that creates and runs virtual machines can be a "hypervisor." The term "virtual machine" also used in a generic sense and can refer to software implementation of a machine or device. Any virtual device which can execute a software program similar to a physical device can be a "virtual machine." A host external device on which a hypervisor runs one or more virtual machines can be referred to as a "host machine."

The term "tunnel" refers to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for any networking layer, sub-layer, or a combination of networking layers.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

The term "edge port" refers to a port in a fabric switch which exchanges data frames with an external device outside of the fabric switch. The term "inter-switch port" refers to a port which couples a member switch of a fabric switch with another member switch and is used for exchanging data frames between the member switches.

The term "switch identifier" refers to a group of bits that can be used to identify a switch. If the switch is an RBridge, the switch identifier can be an "RBridge identifier." The TRILL standard uses "RBridge ID" to denote a 48-bit Intermediate-System-to-Intermediate-System (IS-IS) ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is used in a generic sense, is not limited to any bit format, and can refer to "RBridge ID," "RBridge nickname," or any other format that can identify an RBridge.

The term "fabric switch" refers to a number of interconnected physical switches which form a single, scalable logical switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally.

Network Architecture

FIG. 1A illustrates an exemplary fabric switch with a virtual tunnel gateway, in accordance with an embodiment of the present invention. As illustrated in FIG. 1A, a fabric switch 100 includes member switches 101, 102, 103, 104, and 105. Switch 101 is coupled to service appliance 132 and a layer-3 router 134; and switch 102 is coupled to layer-3 router 134 and a physical switch 136. Appliance 132 can provide a service to fabric switch 100, such as firewall protection, load balancing, and instruction detection. Member switches in fabric switch 100 send frames outside of fabric switch 100 via router 134. Switch 136 can be coupled to other devices, such as a high-performance database. Member switches in fabric switch 100 use edge ports to communicate to external devices and inter-switch ports to communicate to other member switches. For example, switch 102 is coupled to external devices, such as router 134 and switch 136, via edge ports and to switches 101, 103, 104, and 105 via inter-switch ports.

Switches 101 and 102 also operate as tunnel gateways (i.e., member tunnel gateways 101 and 102) in fabric switch 100. Switches 101 and 102 are virtualized as a virtual gateway switch 150. Switches 103, 104, and 105 consider virtual gateway switch 150 as another member switch reachable via switches 101 and 102. Virtual gateway switch 150 is also virtualized as a virtual member tunnel gateway 150 to the hypervisors coupled to fabric switch 100. Hence, the terms "member switch" and "member tunnel gateway" are used interchangeably for virtual gateway switch 150, and associated member switches 101 and 102. Virtual tunnel gateway 150 is associated with a virtual IP address and a virtual MAC address. Member tunnel gateways 101 and 102 are associated with these virtual addresses in conjunction with each other. Consequently, member tunnel gateways 101 and 102 consider these virtual addresses as local addresses. In some embodiments, fabric switch 100 is a TRILL network;

switches 101, 102, 103, 104, and 105 are RBridges; and data frames transmitted and received via inter-switch ports are encapsulated in TRILL headers. Under such a scenario, virtual member tunnel gateway 150 can be a virtual RBridge with a virtual RBridge identifier. Switch virtualization in a fabric switch and its associated operations, such as data frame forwarding, are specified in U.S. Patent Publication No. 2010/0246388, titled "Redundant Host Connection in a Routed Network," the disclosure of which is incorporated herein in its entirety.

Host machines 112 and 114 are coupled to switches 103 and 105, respectively. During operation, switch 103 discovers the hypervisor of host machine 112. Switch 103 then sends a configuration message to the hypervisor with the virtual IP address, and optionally, the virtual MAC address associated with virtual member tunnel gateway 150. In some embodiments, switch 103 forwards the hypervisor information toward virtual gateway switch 150. Switch 101 or 102 receives the information and sends the configuration message to the hypervisor via switch 103. Upon receiving the configuration message, the hypervisor is dynamically configured with the virtual IP address as the tunnel gateway address. In the same way, the hypervisor in host machine 114 is also configured with the virtual IP address as the tunnel gateway address. This allows fabric switch 100 to act as a distributed tunnel gateway represented by virtual member tunnel gateway 150.

Suppose that virtual machine 122 in host machine 112 initiates a data communication which crosses its VLAN boundary and sends an associated data frame toward router 134. The hypervisor in host machine 112 initiates an overlay tunnel for the frame by encapsulating the frame in a layer-3 packet with the virtual IP address as the destination IP address. Examples of such a tunnel include, but are not limited to, Virtual Extensible Local Area Network (VXLAN), Generic Routing Encapsulation (GRE), and its variations, such as Network Virtualization using GRE (NVGRE) and openvSwitch GRE. The hypervisor in host machine 112 can further encapsulate the packet in an Ethernet frame with the virtual MAC address as the destination MAC address, and forwards the frame toward virtual member tunnel gateway 150.

Upon receiving the frame, egress switch 103 identifies the destination MAC address to be associated with virtual gateway switch 150. Switch 103 considers virtual gateway switch 150 to be another member switch and forwards the frame to switch 101. Upon receiving the frame, switch 101 recognizes the virtual IP and MAC addresses to be local addresses, extracts the inner packet, and forwards the inner packet to router 134 based on the forwarding information of the inner packet. Similarly, if virtual machine 124 in host machine 114 sends a frame toward switch 136, the hypervisor in host machine 114 tunnels the frame by encapsulating the frame in a layer-3 packet with the virtual IP address as the destination IP address. Switch 103 receives the frame, recognizes the virtual IP and MAC addresses to be local addresses, extracts the inner packet, and forwards the inner packet to switch 136 based on the forwarding information of the inner packet.

Suppose that virtual machine 122 requires migration from host machine 112 to a remote location via router 134. The hypervisor of host machine 112 tunnels the data associated with the migration by encapsulating the data in an IP packet with the virtual IP address of virtual member tunnel gateway 150 as the destination address. On the other hand, if virtual machine 122 requires migration from host machine 112 to host machine 114, the hypervisor of host machine 112 can simply send the associated data to the hypervisor of host machine 114, as long as they are configured with the same VLAN. If virtual tunnel gateway 150 also operates a default router for the hypervisors in host machines 112 and 114, the hypervisor of host machine 112 can tunnel the associated data directly to the hypervisor of host machine 114 via default router 150. Member tunnel gateways 101 and 102 can age out the tunnels from the hypervisors of host machines 112 and 114 upon detecting inactivity from the tunnels. In some embodiments, member tunnel gateways 101 and 102 maintain an activity bit for a respective tunnel to indicate activity or inactivity over a period of time.

Figure 1B:
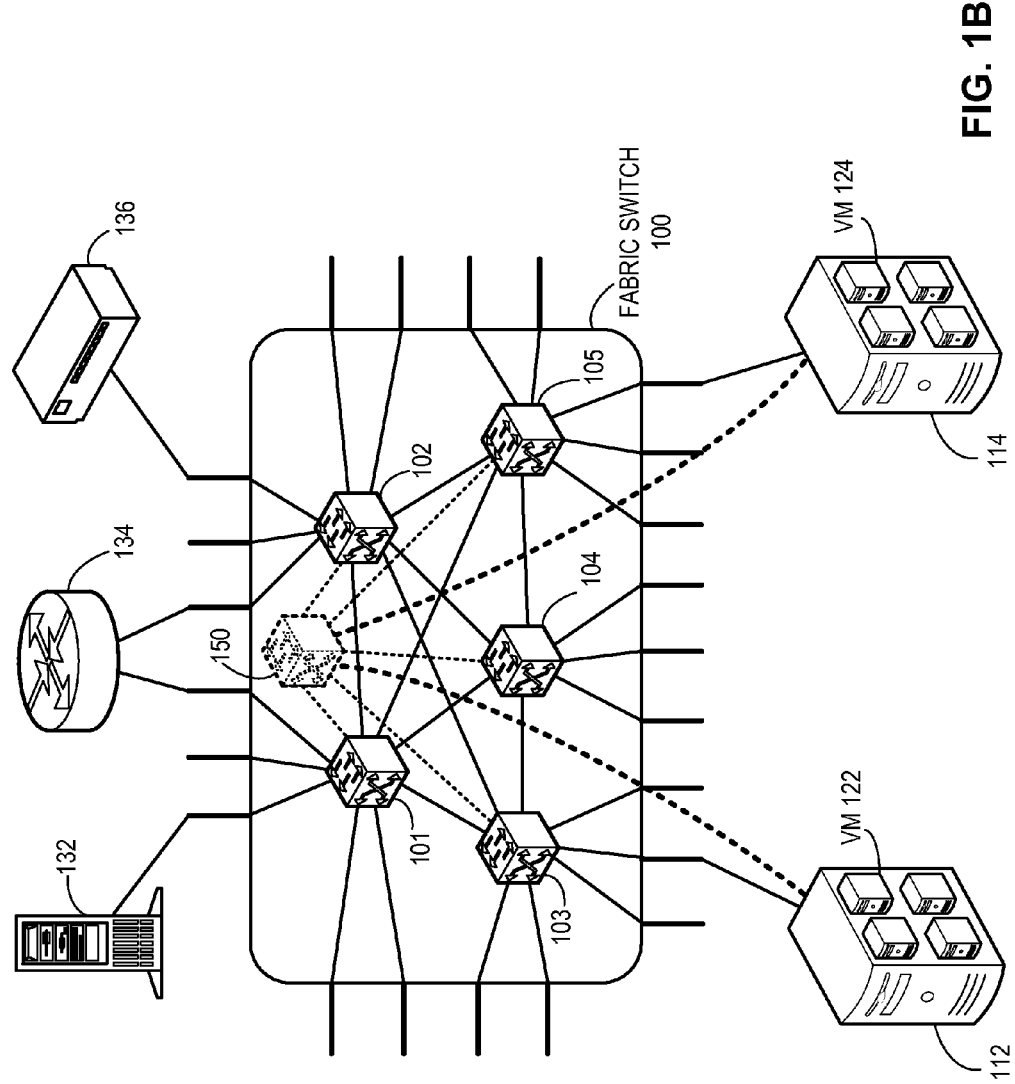
FIG. 1B illustrates a virtual tunnel gateway being associated with a respective member switch of a fabric switch in conjunction with the example in FIG. 1A, in accordance with an embodiment of the present invention.

FIG. 1B illustrates a virtual tunnel gateway being associated with a respective member switch of a fabric switch in conjunction with the example in FIG. 1A, in accordance with an embodiment of the present invention. Because the entire fabric switch 100 appears as a single tunnel gateway represented by virtual member tunnel gateway 150, another member tunnel gateway can be dynamically added to fabric switch 100. In some embodiments, existing member switches can be configured as member tunnel gateways as well. In the example of FIG. 1B, switches 103, 104, and 105 are also configured as member tunnel gateways. Switches 103, 104, and 105 become associated with virtual gateway switch 150, and establish association with the corresponding virtual IP address and the virtual MAC address. The hypervisors of host machines 112 and 114 simply continue to tunnel frames by encapsulating the frames using the virtual IP address. Consequently, when the hypervisor in host machine 112 tunnels frames toward virtual member tunnel gateway 150, egress switch 103 recognizes the virtual IP and MAC addresses and local addresses, extracts the inner frame, and forwards the frame to router 134 based on the forwarding information of the inner frame.

Network Configurations

Figure 2A:
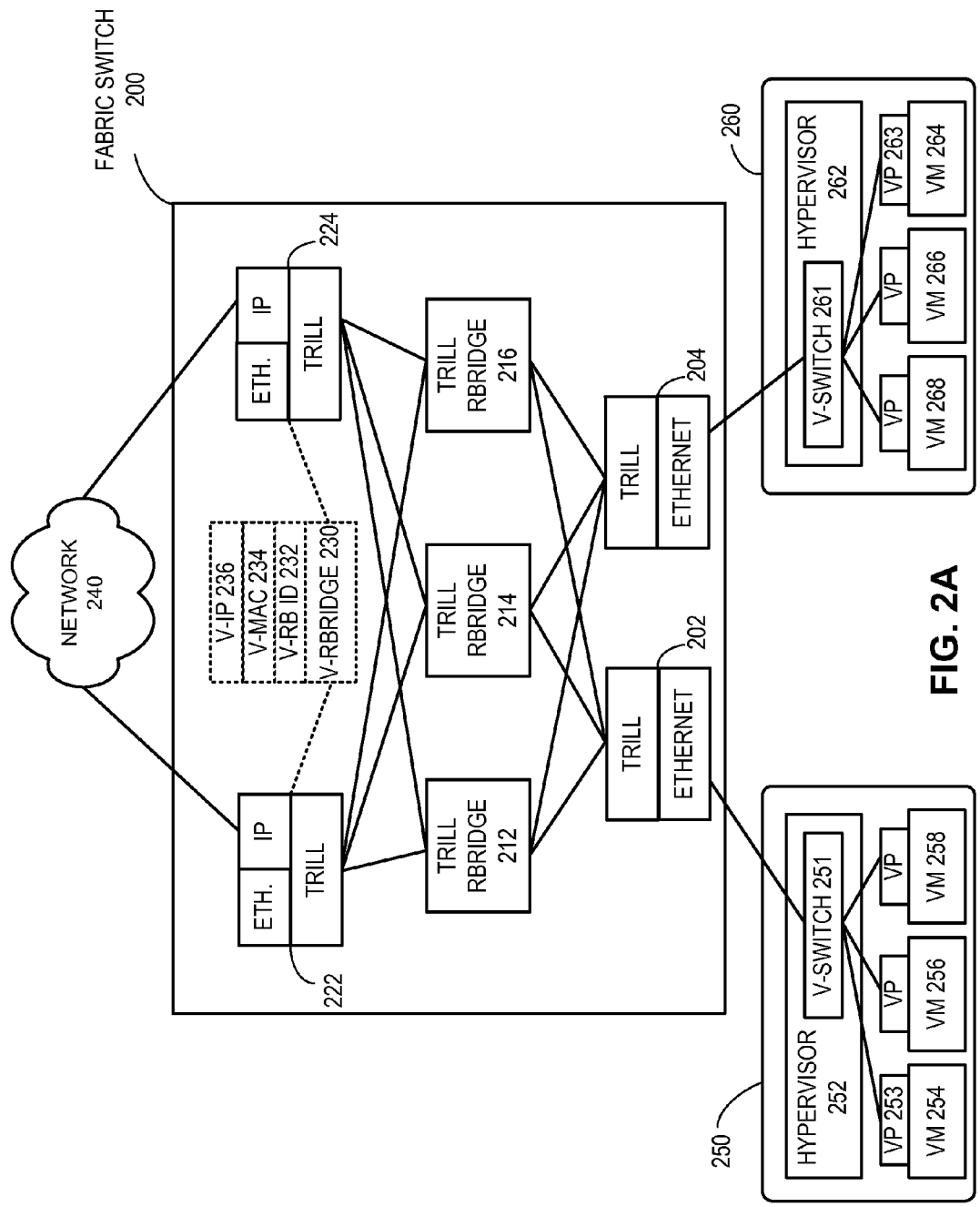
FIG. 2A illustrates an exemplary configuration of a fabric switch with a virtual tunnel gateway, in accordance with an embodiment of the present invention.

FIG. 2A illustrates an exemplary configuration of a fabric switch with a virtual tunnel gateway, in accordance with an embodiment of the present invention. In this example, a fabric switch 200 includes switches 212, 214, and 216. Fabric switch 200 also includes switches 202, 204, 222 and 224, each with a number of edge ports which can be coupled to external devices. For example, switches 202 and 204 are coupled with host machines 250 and 260 via Ethernet edge ports. Switches 222 and 224 are coupled to network 240, which can be any local or wide area network, such as the Internet. Host machine 250 includes virtual machines 254, 256, and 258, which are managed by hypervisor 252. Host machine 260 includes virtual machines 264, 266, and 268, which are managed by hypervisor 262. Virtual machines in host machines 250 and 260 are logically coupled to virtual switches 251 and 261, respectively, via their respective virtual ports. For example, virtual machines 254 and 264 are coupled to virtual switches 251 and 261, respectively, via virtual ports 253 and 263, respectively.

In some embodiments, switches in fabric switch 200 are TRILL RBridges and in communication with each other using TRILL protocol. These RBridges have TRILL-based inter-switch ports for connection with other TRILL RBridges in fabric switch 200. Although the physical switches within fabric switch 200 are labeled as "TRILL RBridges," they are different from conventional TRILL RBridge in the sense that they are controlled by the Fibre Channel (FC) switch fabric control plane. In other words, the assignment of switch addresses, link discovery and maintenance, topology convergence, routing, and forwarding can be handled by the corresponding FC protocols. Particularly, each TRILL RBridge's switch ID or nickname is mapped from the corresponding FC switch domain ID, which can be automatically assigned when a switch joins fabric switch 200 (which is logically similar to an FC switch fabric).

Note that TRILL is only used as a transport between the switches within fabric switch 200. This is because TRILL can readily accommodate native Ethernet frames. Also, the TRILL standards provide a ready-to-use forwarding mechanism that can be used in any routed network with arbitrary topology (although the actual routing in fabric switch 200 is done by the FC switch fabric protocols). Embodiments of the present invention should be not limited to using only TRILL as the transport. Other protocols (such as multi-protocol label switching (MPLS) or Internet Protocol (IP)), either public or proprietary, can also be used for the transport.

In the example in FIG. 2, RBridges 222 and 224 are also member tunnel gateways. In some embodiments, a respective member tunnel gateway is capable of processing layer-3 (e.g., IP) packets to facilitate layer-3 overlay tunnels over layer-2 and TRILL network. RBridges 222 and 224 are virtualized as a virtual RBridge 230 (which corresponds to a virtual gateway switch) with virtual RBridge identifier 232. RBridges 222 and 224 are associated with virtual RBridge identifier 232. RBridges 202, 204, 212, 214, and 216 consider virtual RBridge 230 as another member switch reachable via RBridges 222 and 224. Virtual RBridge 230 is presented to hypervisors 252 and 262 as virtual member tunnel gateway 230. Hence, the terms "RBridge" and "member tunnel gateway" are used interchangeably for virtual RBridge 230, and associated RBridges 222 and 224. Virtual tunnel gateway 230 is associated with a virtual IP address 236 and a virtual MAC address 234. Member tunnel gateways 222 and 224 are associated with virtual IP address 236 and virtual MAC address 234. Consequently, member tunnel gateways 222 and 224 consider virtual IP address 236 and virtual MAC address 234 as local addresses.

During operation, RBridge 202 discovers hypervisor 252. RBridge 202 then sends a configuration message to hypervisor 252 comprising virtual IP address 236, and optionally, virtual MAC address 234. If not provided, hypervisor 252 can obtain virtual MAC address 234 by sending an Address Resolution Protocol (ARP) query with virtual IP address 236. RBridge 222 or 224 can resolve the ARP query and send a response comprising MAC address 234. Managing a virtual IP address and a virtual MAC address in a fabric switch and its associated operations, such as ARP query resolution, are specified in U.S. patent application Ser. No. 13/312,903, titled "Layer-3 Support in TRILL Networks," the disclosure of which is incorporated herein in its entirety. In some embodiments, RBridge 202 forwards the hypervisor information toward virtual RBridge 230, and, in response, RBridge 222 or 224 sends the configuration message to hypervisor 252 via switch 202.

Upon receiving the configuration message, hypervisor 252 configures virtual IP address 236 as the tunnel gateway address, which can also be the default router IP address for hypervisor 252. In some embodiments, RBridge 222 can use Dynamic Host Configuration Protocol (DHCP) for providing the configuration information. Similarly, upon receiving a configuration message from RBridge 204, hypervisor 262 configures virtual IP address 236 as the tunnel gateway address for hypervisor 262. Suppose that virtual machine 254 sends a frame toward network 240. Hypervisor 252, via virtual switch 251, tunnels the frame by encapsulating the frame in a layer-3 packet with virtual IP address 236 as the destination IP address. Hypervisor 252 further encapsulates the packet in an Ethernet frame with virtual MAC address 234 as the destination MAC address, and forwards the frame to RBridge 202. Upon receiving the frame, egress RBridge 202 identifies virtual MAC address 234 to be associated with virtual RBridge 230 reachable via RBridges 222 and 224. RBridge 202 then encapsulates the frame in a TRILL packet with virtual RBridge identifier 232 as the egress RBridge identifier and forwards the frame toward virtual RBridge 230.

The TRILL packet is received by one of intermediate RBridges 212 and 214, and forwarded to RBridge 222 or 224 based on the TRILL routing in fabric switch 200. Suppose that RBridge 222 receives the TRILL packet. RBridge 222 identifies virtual RBridge identifier 232 as the egress RBridge identifier and recognizes virtual RBridge identifier 232 as a local RBridge identifier. RBridge 222 removes the TRILL encapsulation and extracts the layer-2 frame. RBridge 222 identifies virtual MAC address 234 as the destination MAC address of the frame and recognizes virtual MAC address 234 to be a local MAC address. Because RBridge 222 has IP processing capability, RBridge 222 then promotes the packet in the frame to the upper layer (e.g., IP layer).

RBridge 222 identifies virtual IP address 232 as the destination IP address of the packet, recognizes virtual IP address 232 as a local IP address, and extracts the inner frame. RBridge 222 thus removes the tunneling encapsulation of hypervisor 252. RBridge 222 then forwards the inner frame to network 240 based on the forwarding information of the inner frame. In this way, the entire fabric switch 200 operates as a tunnel gateway for hypervisor 252.

When RBridge 222 removes the tunneling encapsulation, RBridge 222 learns the MAC address of virtual machine 254 from the inner frame. In some embodiments, RBridge 222 learns the MAC address of virtual machine 254 directly from the tunnel encapsulated packet. RBridge 222 can also learn other associated information, such as the MAC and IP addresses of hypervisor 252, and outer and inner VLANs associated with the frame. In some embodiments, RBridge 222 shares the learned information with other member tunnel gateways in fabric switch 200, such as RBridge 224. RBridge 224 can consider the information received from RBridge 222 to be learned from a locally terminated tunnel.

In this way, RBridges 222 and 224 learn the MAC addresses (and the associated information) of virtual machines 256, 258, 264, 266, and 268 as well. In some embodiments, RBridges 222 and 224 share the learned MAC addresses with the rest of fabric switch 200. RBridges 222 and 224 can also share the learned associated information with the rest of fabric switch 200 as well. Consequently, whenever any member switch of fabric switch 200 learns a MAC address, all other member switches learn the MAC address as well. In some embodiments, switches 202 and 204 use internal control messages to share the learned MAC addresses.

In some embodiments, all RBridges in fabric switch 200 operate as member tunnel gateways and are associated with virtual RBridge 230. Under such a scenario, RBridge 202 removes tunneling encapsulation of hypervisor 252 and extracts the internal frame. RBridge 202 recognizes network 240 to be reachable via RBridges 222 and 224. RBridge 202 then encapsulates the inner frame in a TRILL packet and forwards the TRILL-encapsulated inner frame toward one of RBridges 222 and 224. If hypervisor 252 is sending multiple frames to network 240, RBridge 202 can use equal cost multiple paths (ECMP). Hence, multi-pathing can be achieved when RBridges 202 and 204 choose to send TRILL-encapsulated data frames toward virtual RBridge 230 via RBridges 222 and 224.

Figure 2B:
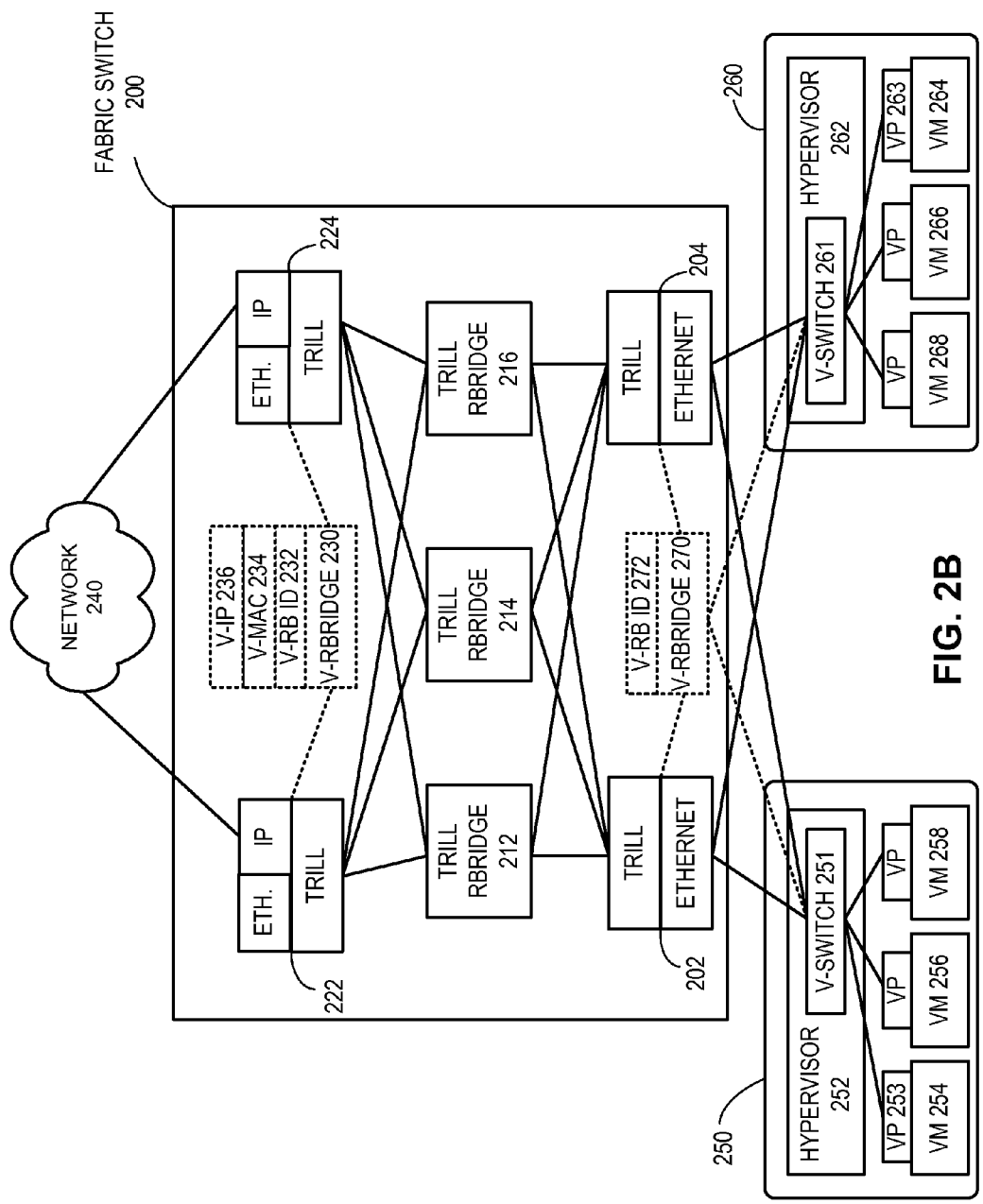
FIG. 2B illustrates exemplary multi-switch trunks coupling a plurality of member switches in a fabric switch, in accordance with an embodiment of the present invention.

FIG. 2B illustrates exemplary multi-switch trunks coupling a plurality of member switches in a fabric switch, in accordance with an embodiment of the present invention. As illustrated in FIG. 2B, RBridges 202 and 204 are configured to operate in a special "trunked" mode for host machines 250 and 260, and hypervisors 252 and 262. Hypervisors 252 and 262 view RBridges 202 and 204 as a common virtual RBridge 270, with a corresponding virtual RBridge identifier 272. Hypervisors 252 and 262 are considered to be logically coupled to virtual RBridge 270 via logical links represented by dotted lines. Virtual RBridge 270 is considered to be logically coupled to both RBridges 202 and 204, optionally with zero-cost links (also represented by dotted lines).

While forwarding data frames from hypervisors 252 and 262, RBridges 202 and 204 encapsulate the frame using the TRILL protocol and assign virtual RBridge identifier 272 as the ingress RBridge identifier. As a result, other RBridges in fabric switch 200 learn that hypervisors 252 and 262, and their corresponding virtual machines are reachable via virtual RBridge 270. In the following description, RBridges which participate in link aggregation are referred to as "partner RBridges." Since the two partner RBridges function as a single logical RBridge, the MAC address reachability learned by a respective RBridge is shared with the other partner RBridge. For example, during normal operation, virtual machine 254 may choose to send its outgoing data frames only via the link to RBridge 202. As a result, only RBridge 202 would learn virtual machine 254's MAC address. This information is then shared by RBridge 202 with RBridge 204 via their respective inter-switch ports. In some embodiments, RBridges 202 and 204 can advertise their respective connectivity (optionally via zero-cost links) to virtual RBridge 270. Hence, multi-pathing can be achieved when other RBridges choose to send data frames to virtual RBridge 270 (which is marked as the egress RBridge in the frames) via RBridges 202 and 204.

Note that virtual RBridge 270 is distinct from virtual RBridge 230. Virtual RBridge 230 represents the member tunnel gateways (i.e., the gateway switches) in fabric switch 200 as a single logical switch, and, in addition to virtual RBridge identifier 232, is typically associated with virtual MAC address 234 and virtual IP address 236. On the other hand, virtual RBridge 270 represents a multi-switch trunk as one logical connection via virtual RBridge 270, and is associated with virtual RBridge identifier 272. Fabric switch 200 can have a plurality of virtual RBridges associated with different multi-switch trunks.

Dynamic Configuration

Figure 3A:
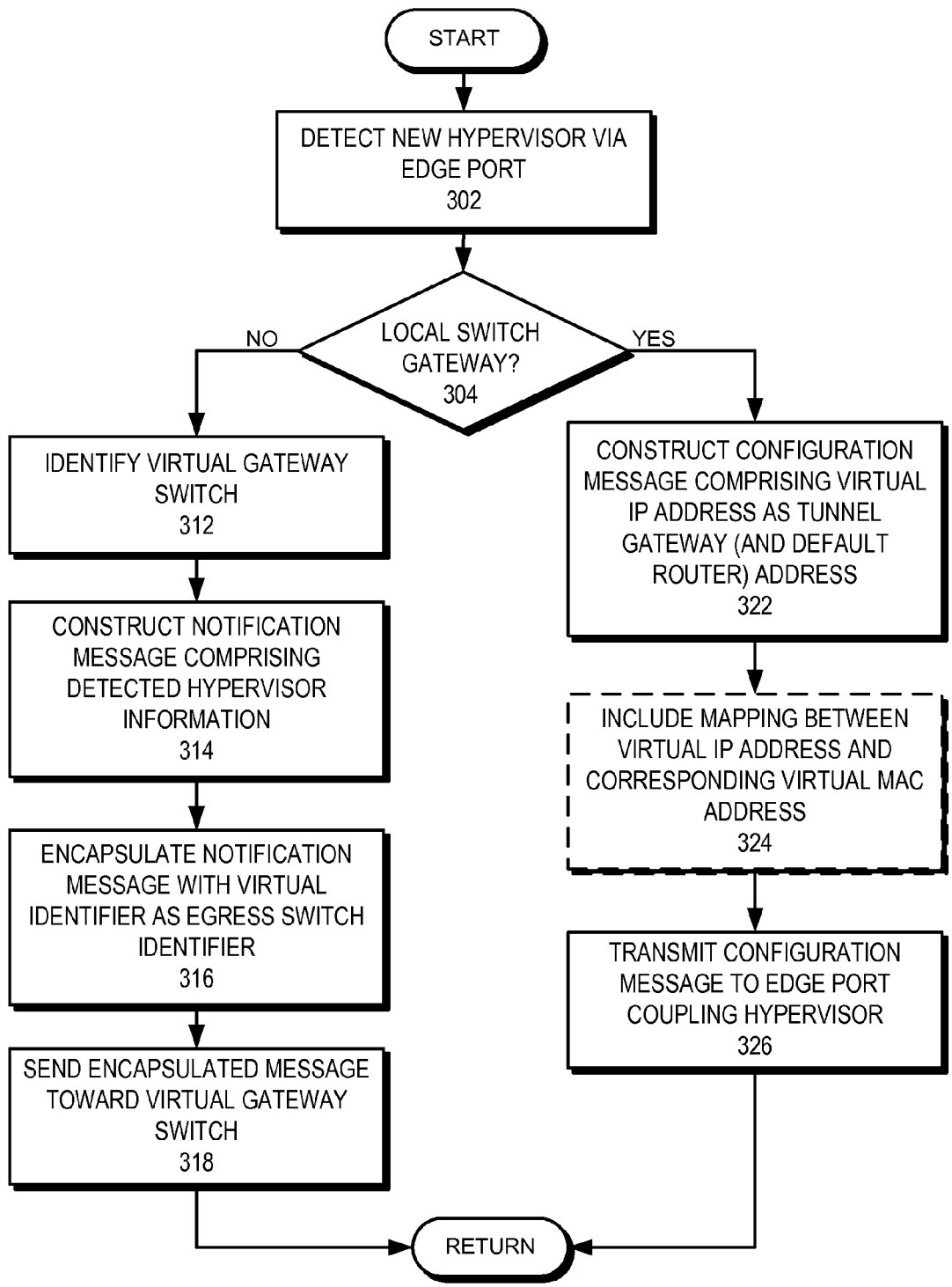
FIG. 3A presents a flowchart illustrating the process of a member switch in a fabric switch facilitating dynamic configuration of a hypervisor discovered via an edge port, in accordance with an embodiment of the present invention.

In the example in FIG. 2A, upon detecting hypervisor 252, RBridge 222 dynamically provides configuration information, such as virtual IP address 236, to hypervisor 252. Hypervisor 252 then configures virtual IP address 236 as the tunnel gateway address, which can also be the default router IP address for hypervisor 252. FIG. 3A presents a flowchart illustrating the process of a member switch in a fabric switch facilitating dynamic configuration of a hypervisor discovered via an edge port, in accordance with an embodiment of the present invention. Upon detecting a new hypervisor via an edge port (operation 302), the switch checks whether the local switch is a tunnel gateway (operation 304). In some embodiments, the switch checks whether the local switch is associated with the virtual IP address to determine whether the local switch is a tunnel gateway.

If the local switch is not a tunnel gateway (operation 304), the switch identifies the virtual gateway switch (operation 312), which is also a virtual tunnel gateway. The switch constructs a notification message comprising detected hypervisor information (operation 314) and encapsulates the notification message with a virtual identifier of the virtual gateway switch as the egress switch identifier (operation 316). In some embodiments, the notification message is encapsulated in a TRILL packet and the virtual identifier is a virtual RBridge identifier. The switch then sends the encapsulated message toward the virtual gateway switch (operation 318).

If the local switch is a tunnel gateway, the switch is aware of the virtual IP address and the virtual MAC address. The switch then constructs a configuration message comprising the virtual IP address as the tunnel gateway address for the hypervisor (operation 322). This configuration message can be a layer-2 notification/control message. In some embodiments, the switch sends the configuration message using DHCP. The configuration message can also indicate the virtual IP address as the default router address for the hypervisor. The switch, operationally, can include a mapping between the virtual IP address and the corresponding virtual MAC address in the configuration message (operation 324). If not included, upon receiving the configuration message, the hypervisor can obtain the virtual MAC address by sending an ARP query with the virtual IP address. The switch then transmits the configuration message to the edge port coupling the hypervisor (operation 326).

Figure 3B:
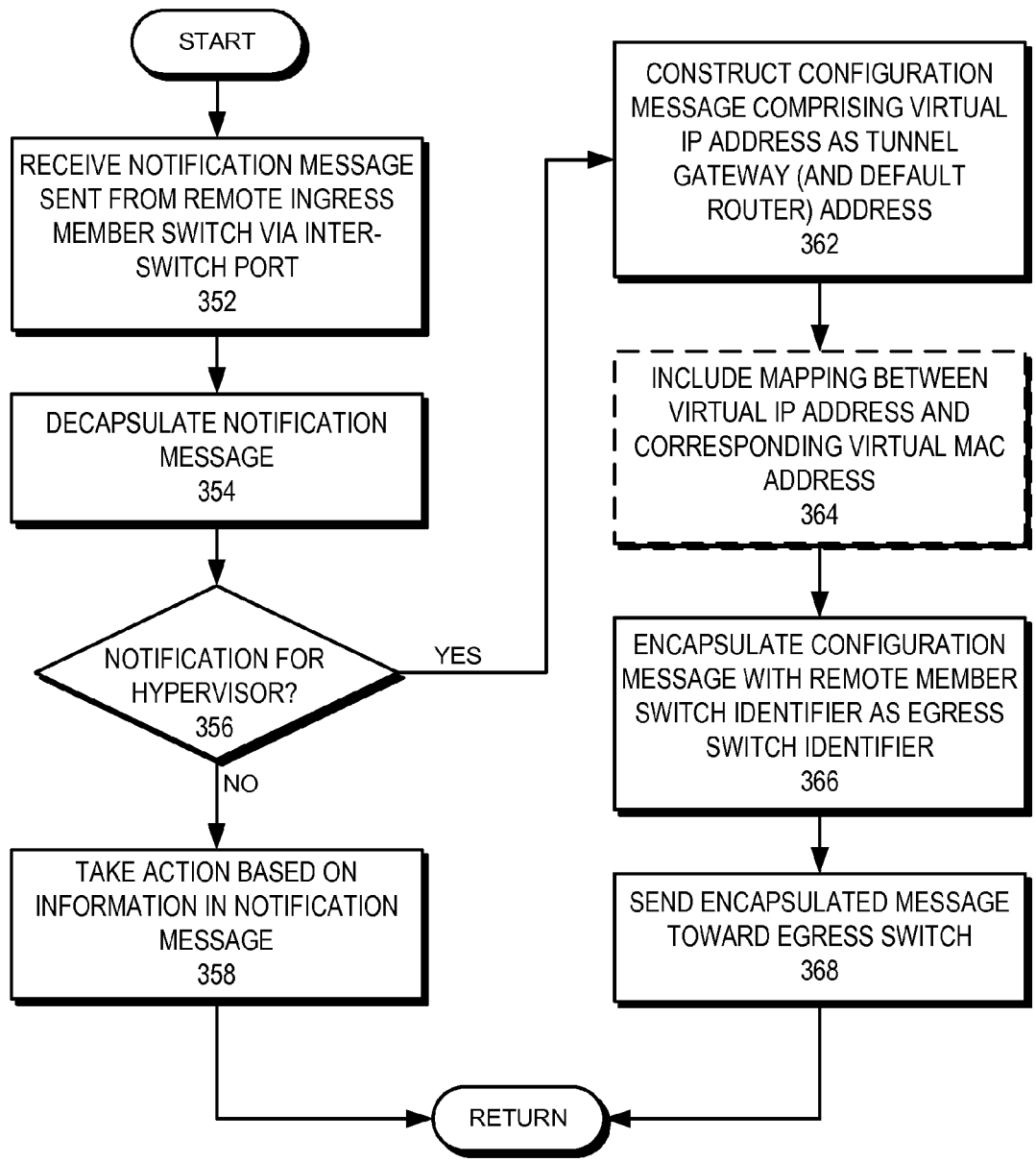
FIG. 3B presents a flowchart illustrating the process of a member switch in a fabric switch facilitating dynamic configuration of a hypervisor discovered via an inter-switch port, in accordance with an embodiment of the present invention.

FIG. 3B presents a flowchart illustrating the process of a member switch in a fabric switch facilitating dynamic configuration of a hypervisor discovered via an inter-switch port, in accordance with an embodiment of the present invention. Upon receiving a notification message from a remote ingress member switch via an inter-switch port (operation 352), the switch decapsulates the notification message (operation 354). In some embodiments, the switch removes a TRILL and/or an FC header to decapsulate the notification message. The switch checks whether the notification message is for a new hypervisor (operation 356). If not, the switch takes action based on the information in the notification message (operation 358).

If the notification message is for a new hypervisor (operation 356), the switch constructs a configuration message comprising the virtual IP address as the tunnel gateway address for the hypervisor (operation 362). The configuration message can also indicate the virtual IP address as the default router address for the hypervisor. The switch, optionally, can include a mapping between the virtual IP address and the corresponding virtual MAC address in the configuration message (operation 364). The switch encapsulates the configuration message with the remote member switch identifier as the egress switch identifier (operation 366). In some embodiments, the notification message is encapsulated in a TRILL packet and the remote member switch identifier is an RBridge identifier. The switch then sends the encapsulated message toward the egress switch (operation 368).

Frame Forwarding

Figure 4A:
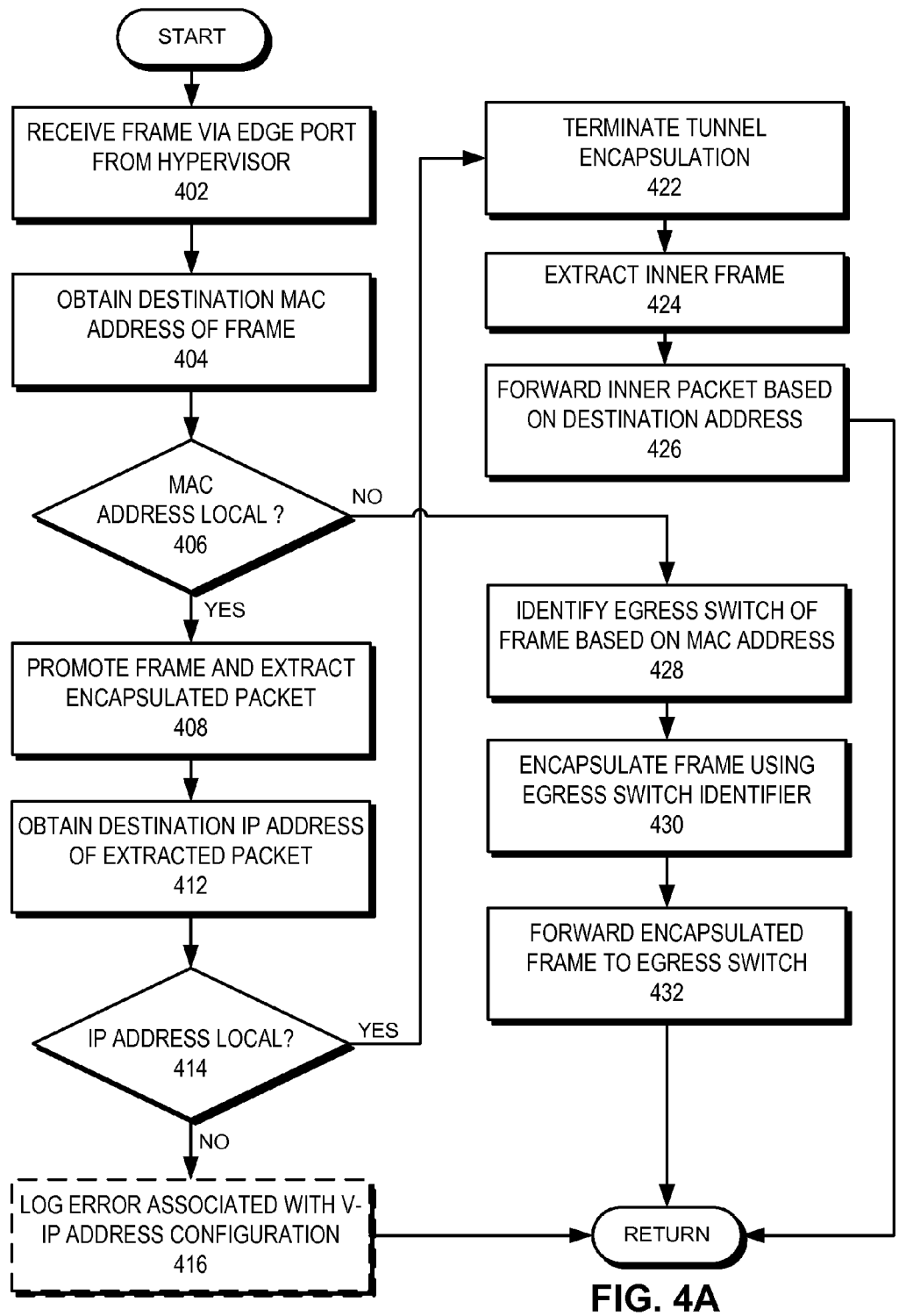
FIG. 4A presents a flowchart illustrating the process of a member switch of a fabric switch forwarding a frame received via an edge port, in accordance with an embodiment of the present invention.

FIG. 4A presents a flowchart illustrating the process of a member switch of a fabric switch forwarding a frame received from a hypervisor via an edge port, in accordance with an embodiment of the present invention. The switch receives a data frame from the hypervisor via an edge port (operation 402) and obtains the destination MAC address of the received frame (operation 404). If the frame has a tunnel encapsulation, the destination MAC address is a virtual MAC address associated with the virtual tunnel gateway. The switch checks whether the MAC address is a local address (operation 406). For example, if the switch is a member tunnel gateway, the virtual MAC address is a local address. If the destination MAC address is local, the switch promotes the frame to the upper layer (e.g., layer-3) and extracts the internal encapsulated packet (operation 408) and obtains the IP address of the extracted packet (operation 412).

The destination IP address of the extracted packet is a virtual IP address associated with the virtual tunnel gateway. The switch checks whether the destination IP address is a local address (operation 414). For example, if the switch is a member tunnel gateway, the virtual IP address is a local address. If the IP address is local, the switch terminates the tunnel encapsulation (i.e., decapsulates the frame) (operation 422). The switch extracts the inner frame (operation 424) and forwards the inner frame based on the destination address of the inner frame (operation 426), as described in conjunction with FIG. 2A. If the IP address is not local (operation 414), the switch is incorrectly configured. If the switch is configured with the virtual MAC address, the switch should also be configured with the corresponding virtual IP address. The switch can optionally log the error associated with the virtual IP address configuration (operation 416).

If the MAC address is not associated with the switch (operation 406), the frame can be a regular layer-2 frame without any tunnel encapsulation. The switch identifies the egress switch associated with the destination MAC address (operation 428). Because a respective member switch in a fabric switch shares the learned MAC addresses with other member switches, the switch can be aware of the egress switch associated with the MAC address. The switch encapsulates the frame using an identifier of the egress switch (operation 430). In some embodiments, the switch encapsulates the frame in a TRILL packet and assigns an RBridge identifier associated with the egress switch as the egress RBridge identifier. The switch then forwards the frame to the egress switch (operation 432).

Figure 4B:
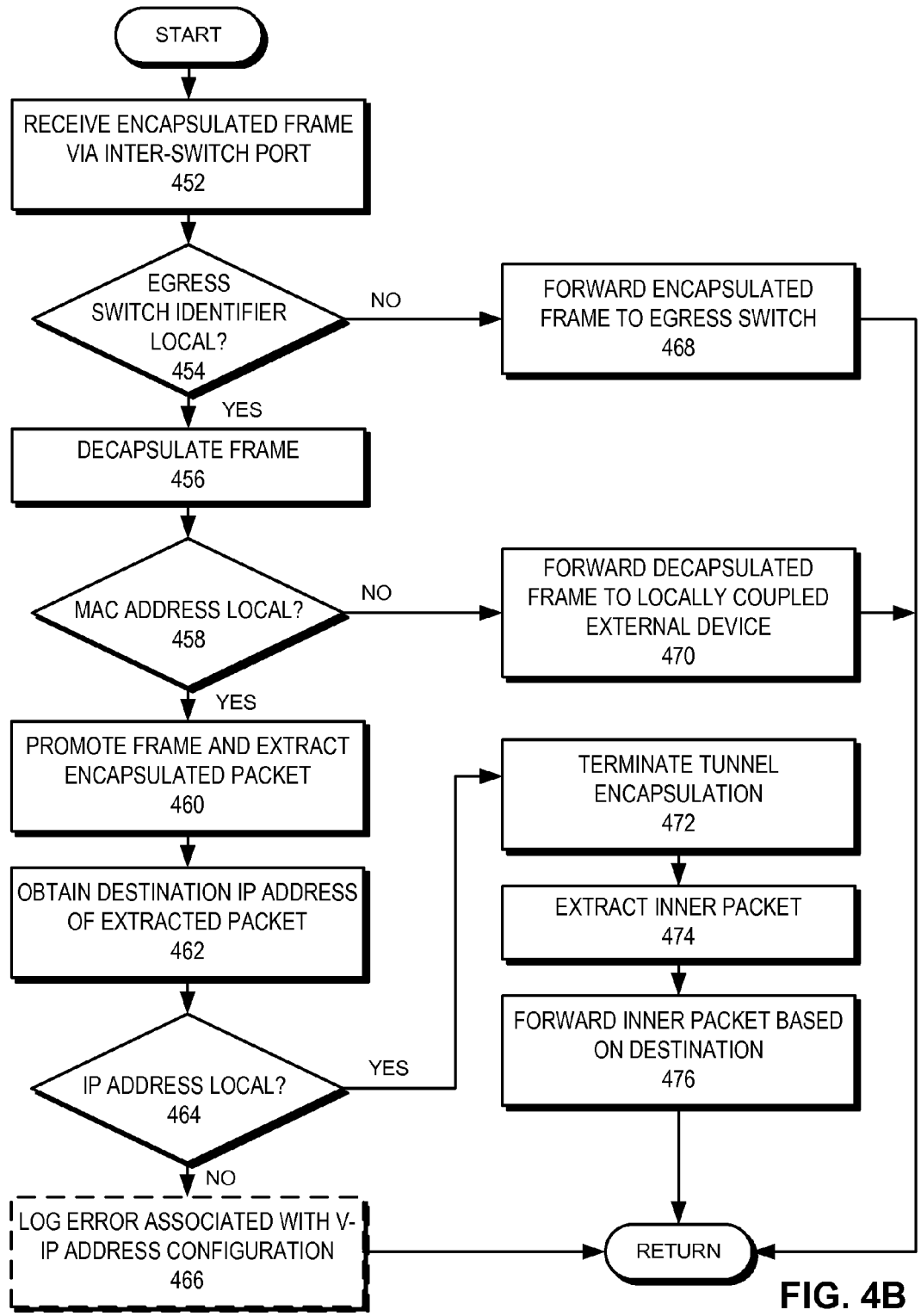
FIG. 4B presents a flowchart illustrating the process of a member switch of a fabric switch forwarding a frame received via an inter-switch port, in accordance with an embodiment of the present invention.

FIG. 4B presents a flowchart illustrating the process of a member switch of a fabric switch forwarding a frame received via an inter-switch port, in accordance with an embodiment of the present invention. The switch receives an encapsulated frame via an inter-switch port (operation 452) and checks whether the egress switch identifier is a local identifier (operation 454). This local identifier can be a virtual switch identifier. If not, the switch forwards the frame toward the egress switch based on the egress switch identifier (operation 468). If the identifier, which can be a virtual switch identifier, is local, the switch decapsulates the frame (operation 456). In some embodiments, the frame encapsulation is based on the TRILL protocol and the egress switch identifier is a virtual RBridge identifier.

If the frame has a tunnel encapsulation, the destination MAC address of the decapsulated frame is a virtual MAC address associated with the virtual tunnel gateway. The switch checks whether the destination MAC address is a local address (operation 458). For example, if the switch is a member tunnel gateway, the virtual MAC address is a local address. If the destination MAC address is not local, the frame is destined for a locally coupled external device, and the switch forwards the decapsulated frame to the locally coupled external device (operation 470). If the MAC address is local, the switch promotes the frame to the upper layer and extracts the internal encapsulated packet (operation 460), and obtains the IP address of the extracted packet (operation 462).

The destination IP address of the extracted packet is a virtual IP address associated with the virtual tunnel gateway. The switch checks whether the IP address is a local address (operation 464). For example, if the switch is a member tunnel gateway, the virtual IP address is a local address. If the IP address is local, the switch terminates the tunnel encapsulation (operation 472). The switch extracts the inner packet (operation 474) and forwards the inner packet based on the destination address of the inner packet (operation 476), as described in conjunction with FIG. 2A. If the destination IP address is not local, the switch is incorrectly configured. If the switch is configured with the virtual MAC address, the switch should also be configured with the virtual IP address. The switch can optionally log the error associated with the virtual IP address configuration (operation 466).

Broadcast, Unknown Unicast, and Multicast Server

Figure 5:
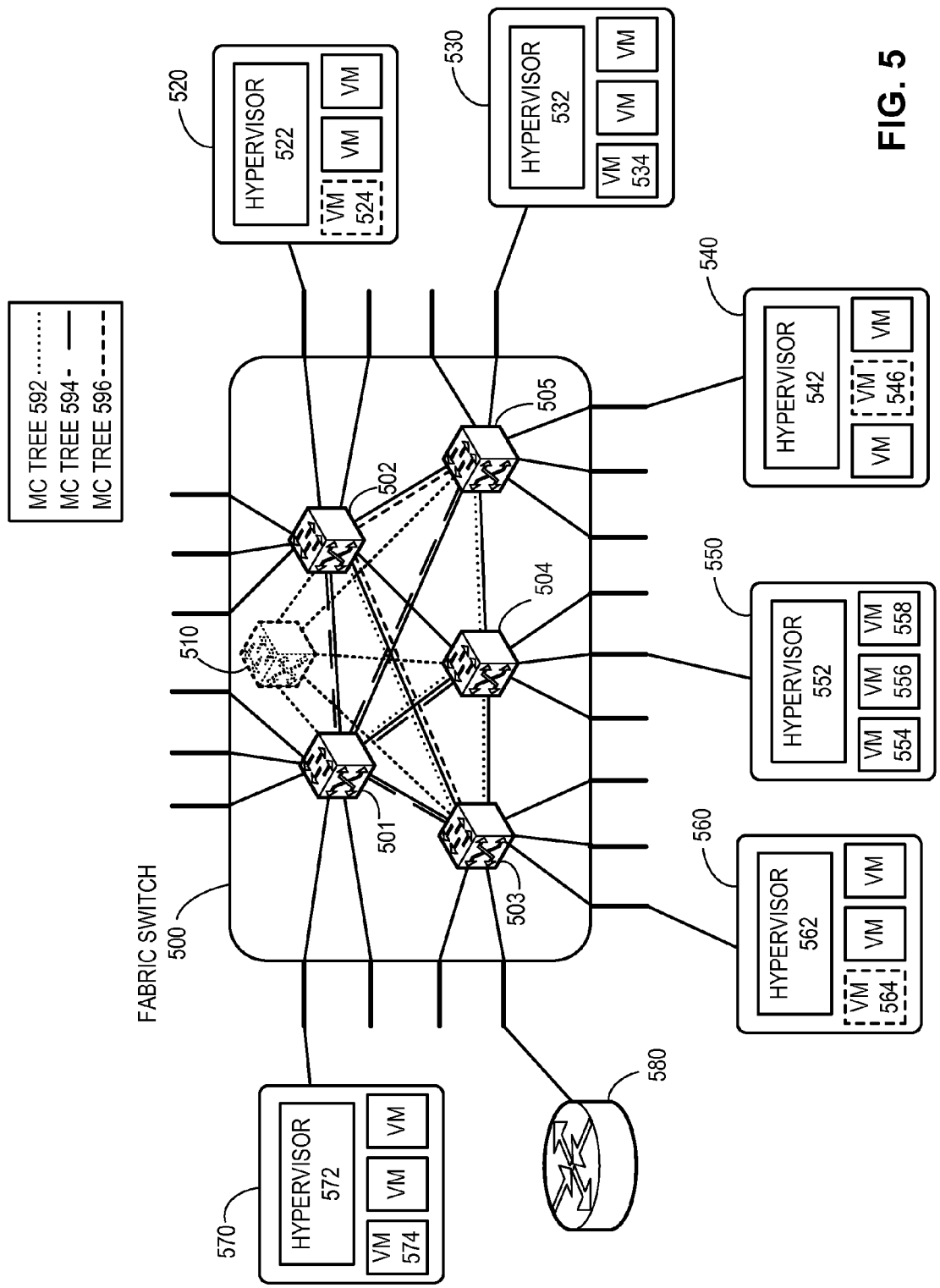
FIG. 5 illustrates an exemplary processing of broadcast, unknown unicast, and multicast traffic in a fabric switch with a virtual tunnel gateway, in accordance with an embodiment of the present invention.

Typically broadcast, unknown unicast, or multicast traffic (which can be referred to as "BUM" traffic) is distributed to multiple recipients. For ease of deployment, hypervisors typically make multiple copies of the data frames belonging to such traffic and individually unicast the data frames. This often leads to inefficient usage of processing capability of the hypervisors, especially in a large scale deployment. To solve this problem, a fabric switch with a virtual tunnel gateway can facilitate efficient distribution of such traffic. FIG. 5 illustrates an exemplary processing of broadcast, unknown unicast, and multicast traffic in a fabric switch with a virtual tunnel gateway, in accordance with an embodiment of the present invention. As illustrated in FIG. 5, a fabric switch 500 includes member switches 501, 502, 503, 504, and 505. Member switches in fabric switch 500 use edge ports to communicate to external devices and inter-switch ports to communicate to other member switches A respective member switch in fabric switch 500 operates as a member tunnel gateway. Switches 501, 502, 503, 504, and 505 are virtualized as a virtual member tunnel gateway 510 to hypervisors 522, 532, 542, 552, 562, and 572 in host machines 520, 530, 540, 550, 560, and 570, respectively. Virtual tunnel gateway 510 is associated with a virtual IP address and a virtual MAC address. All member tunnel gateways consider these virtual addresses to be local addresses. In some embodiments, fabric switch 500 is a TRILL network; switches 501, 502, 503, 504, and 505 are RBridges; and data frames transmitted and received via inter-switch ports are encapsulated using the TRILL protocol. Under such a scenario, virtual member tunnel gateway 510 can be a virtual RBridge with a virtual RBridge identifier.

To facilitate multicast traffic distribution, fabric switch 500 maintains states for a respective multicast group associated with hypervisors 522, 532, 542, 552, 562, and 572. Note that such states are not proportional to the number of virtual machines coupled to the fabric, but are dependent on the number of multicast groups and VLANs associated with the virtual machines. A respective member tunnel gateway in fabric switch 500 is aware of the VLAN and multicast group association of a respective hypervisor. When a virtual machine sends a join or leave request for a multicast group, the corresponding hypervisor tunnels the request to the virtual IP address of virtual tunnel gateway 510.

In some embodiments, a respective hypervisor implements a multicast proxy server (e.g., an Internet Group Management Protocol (IGMP) proxy server) and sends only the first join and last leave requests associated with a specific multicast group. For example, if virtual machines 554, 556, and 558 send join requests for a multicast group, hypervisor 552 sends only the first join request toward virtual member tunnel gateway 510. On the other hand, if virtual machines 554 and 558 send leave requests for the multicast group, hypervisor 552 does not send out the leave requests because virtual machine 556 continues to receive traffic for the multicast group. However, when virtual machine 556 sends a leave request for the multicast group, hypervisor 552 recognizes it to be the last leave request and forwards the leave request toward virtual member tunnel gateway 510.

During operation, virtual machines 524, 546, and 564 become members of a multicast group. When switch 503 receives a multicast frame from multicast router 580, switch 503 forwards the frame via multicast tree 592. As a result, a respective switch in fabric switch receives the frame. Switches 502, 503, and 505 transmit the frame to corresponding hypervisors 522, 542, and 562, while switches 501 and 504 discard the frame. In some embodiments, switch 503 identifies virtual machines 524, 546, and 564 to be the members of the multicast group, and forwards the frame via multicast tree 596, which includes only switches 502, 503, and 505.

In some embodiments, fabric switch 500 operates as an ARP server. When virtual machine 534 sends an ARP request, instead of broadcasting (i.e., unicasting multiple copies), hypervisor 532 tunnels a single copy of the request toward virtual member tunnel gateway 510. Switch 505, which is also a member tunnel gateway, receives and decapsulates the request, as described in conjunction with FIGS. 2A and 2B. Switch 505 then distributes the request in fabric switch 500 via multicast tree 592. Similarly, when virtual machine 574 sends an ARP request, hypervisor 572 tunnels a single copy of the request toward virtual member tunnel gateway 510. Switch 501 receives the request and distributes the frame in fabric switch 500 via a different multicast tree 594. In this way, the member tunnel gateways in fabric switch 500 load balance across a plurality of multicast trees for broadcast, unknown unicast, or multicast traffic. Selection of multicast tree can further depend on VLAN memberships of the member switches.

Figure 6:
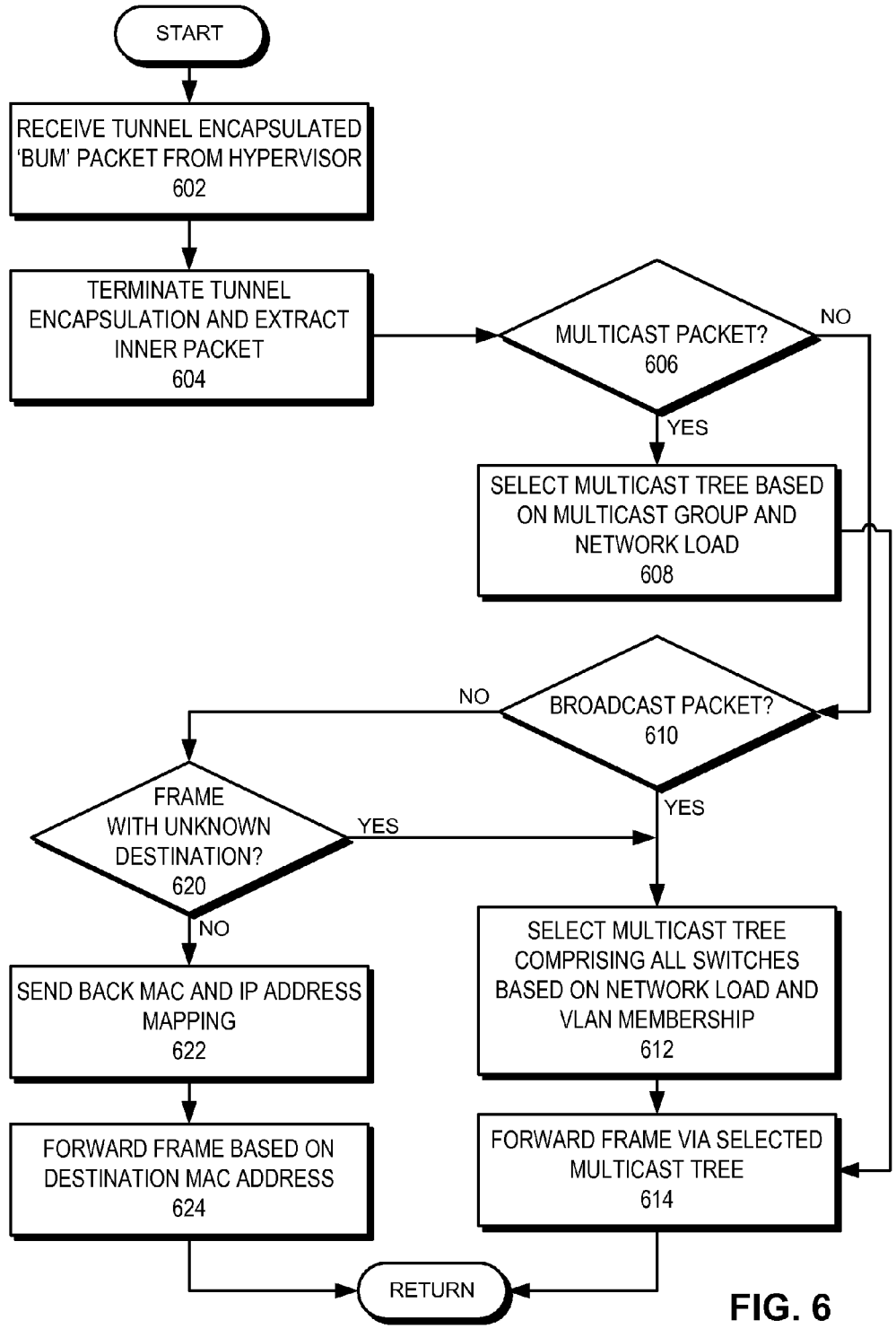
FIG. 6 presents a flowchart illustrating the process of a member tunnel gateway in a fabric switch processing broadcast, unknown unicast, and multicast traffic, in accordance with an embodiment of the present invention.

FIG. 6 presents a flowchart illustrating the process of a member tunnel gateway in a fabric switch processing broadcast, unknown unicast, and multicast traffic, in accordance with an embodiment of the present invention. The member tunnel gateway receives a packet, which is part of a broadcast, unknown unicast, or multicast traffic flow, from a hypervisor (operation 602). This packet is encapsulated with the virtual MAC and IP addresses of a virtual member tunnel gateway, as described in conjunction with FIG. 5. The member tunnel gateway terminates the tunnel encapsulation and extracts the inner packet (operation 604), as described in conjunction with FIGS. 4A and 4B. The member tunnel gateway checks whether the packet is a multicast packet (operation 606). If so, the member tunnel gateway selects a multicast tree in the fabric switch based on the multicast group and the network load (operation 608).

If the packet is not a multicast packet, the member tunnel gateway checks whether the packet is a broadcast packet (operation 610). For example, an ARP request from a hypervisor is a layer-2 broadcast frame encapsulated in a layer-3 packet. If the packet is not a broadcast packet, the member tunnel gateway checks whether the packet is a frame of unknown destination (operation 620). If the packet is not a frame of unknown destination (i.e., the member tunnel gateway has already learned the destination MAC address), the member tunnel gateway sends back a mapping of the destination MAC address and the corresponding IP address (which can be a hypervisor IP address) (operation 622) and forwards the frame based on the destination MAC address (operation 624). For example, the MAC address can be associated with a remote member switch. The member tunnel gateway forwards the frame toward that remote member switch.

If the packet is a broadcast packet (operation 610) or the packet is a frame with unknown destination (operation 620), the member tunnel gateway selects a multicast tree comprising all switches in the fabric switch based on network load and VLAN configuration (operation 612). After selecting a multicast tree (operations 608 and 612), the member tunnel gateway forwards the frame via the selected multicast tree (operation 614). In some embodiments, for multicast traffic of a multicast group, the member tunnel gateway selects a multicast tree only with the member switches coupling virtual machines belonging to the multicast group (e.g., multicast tree 596 in the example in FIG. 5).

Exemplary Switch

Figure 7:
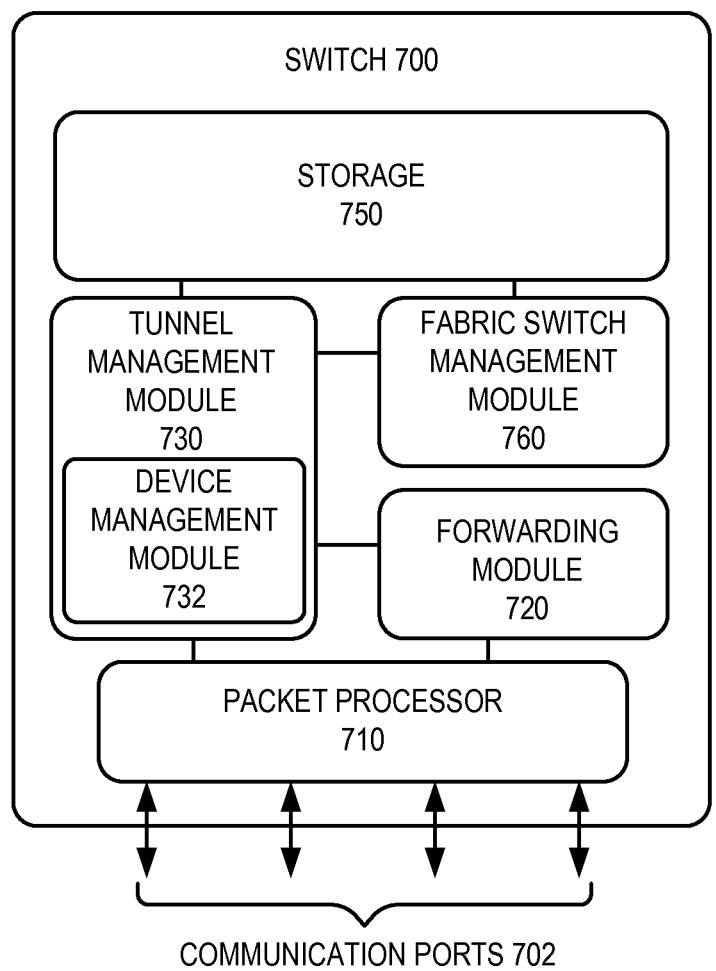
FIG. 7 illustrates an exemplary member switch associated with a virtual member tunnel gateway in a fabric switch, in accordance with an embodiment of the present invention.

FIG. 7 illustrates an exemplary member switch associated with a virtual member tunnel gateway in a fabric switch, in accordance with an embodiment of the present invention. In this example, a switch 700 includes a number of communication ports 702, a forwarding module 720, a tunnel management module 730, a packet processor 710 coupled to tunnel management module 730, and a storage 750. In some embodiments, switch 700 may maintain a membership in a fabric switch, wherein switch 700 also includes a fabric switch management module 760. Fabric switch management module 760 maintains a configuration database in storage 750 that maintains the configuration state of a respective switch within the fabric switch. Fabric switch management module 760 maintains the state of the fabric switch, which is used to join other switches. Under such a scenario, communication ports 702 can include inter-switch communication channels for communication within a fabric switch. This inter-switch communication channel can be implemented via a regular communication port and based on any open or proprietary format.

Tunnel management module 730 operates switch 700 as a tunnel gateway capable of terminating an overlay tunnel, as described in conjunction with FIG. 2A. Tunnel management module 730 also maintains an association between switch 700 and a virtual tunnel gateway. The virtual tunnel gateway is associated with a virtual IP address. If switch 700 is a member switch of a fabric switch, the virtual IP address can also be associated with another member switch of the fabric switch. This other member switch also operates as a tunnel gateway and is associated with the virtual tunnel gateway. In some embodiments, switch 700 is a TRILL RBridge. Under such a scenario, the virtual tunnel gateway is also associated with a virtual RBridge identifier.

In some embodiments, switch 700 also includes a device management module 732, which operates in conjunction with the packet processor. Upon detecting a new hypervisor, device management module 732 generates a configuration message comprising the virtual IP address as a tunnel gateway address for the hypervisor, as described in conjunction with FIGS. 3A and 3B. In some embodiments, the virtual IP address in the configuration message also corresponds to a default gateway router. During operation, the hypervisor initiates an overlay tunnel with switch 700 by encapsulating inner data packets in another layer-3 data packet.

Upon receiving the tunnel encapsulated data packet from the hypervisor, packet processor 710 identifies in the data packet the virtual IP address associated with the virtual tunnel gateway and extracts the inner packet from the data packet. In some embodiments, the packet is TRILL encapsulated and is received via one of the communication ports 702 capable of receiving TRILL packets. Packet processor 710 identifies the virtual RBridge identifier in the TRILL header, as described in conjunction with FIG. 2A. Forwarding module 720 then determines an output port from one of the communication ports 702 for the inner packet based on the destination address of the inner packet. To facilitate layer-2 switching, the encapsulated data packet can include a virtual MAC address mapped to the virtual IP address. Packet processor 710 can identify this virtual MAC address in the data packet as well.

Note that the above-mentioned modules can be implemented in hardware as well as in software. In one embodiment, these modules can be embodied in computer-executable instructions stored in a memory which is coupled to one or more processors in switch 700. When executed, these instructions cause the processor(s) to perform the aforementioned functions.

In summary, embodiments of the present invention provide a switch and a method for facilitating overlay tunneling in a fabric switch. In one embodiment, the switch includes a tunnel management module, a packet processor, and a forwarding module. The tunnel management module operates the switch as a tunnel gateway capable of terminating an overlay tunnel. During operation, the packet processor, which is coupled to the tunnel management module, identifies in a data packet a virtual IP address associated with a virtual tunnel gateway. This virtual tunnel gateway is associated with the switch and the data packet is associated with the overlay tunnel. The forwarding module determines an output port for an inner packet in the data packet based on a destination address of the inner packet.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
a tunnel management module configurable to:
operate the switch as a tunnel gateway capable of terminating an overlay tunnel;
learn a MAC address of a virtual machine via a tunnel initiated by a first hypervisor associated with the virtual machine; and
construct a message for a second hypervisor comprising an Internet Protocol (IP) address of the first hypervisor in response to receiving a data frame with unknown destination from a virtual machine associated with the second hypervisor; and
a packet processor configurable to identify in a data packet a virtual IP address associated with a virtual tunnel gateway, wherein the virtual tunnel gateway is associated with the switch; and
a forwarding module configurable to determine an output port for an inner packet in the data packet based on a destination address of the inner packet.

2. The switch of claim 1, wherein the tunnel management module is further configurable to identify a hypervisor controlling a virtual machine, wherein the virtual machine initiates the overlay tunnel by encapsulating the inner packet using the virtual IP address.

3. The switch of claim 1, wherein the packet processor is further configurable to identify in the data packet a virtual media access control (MAC) address corresponding to the virtual IP address.

4. The switch of claim 1, further comprising a device management module configurable to generate a configuration message comprising the virtual IP address as a tunnel gateway address in response to detecting a hypervisor.

5. The switch of claim 4, wherein the virtual IP address in the configuration message corresponds to a default gateway router.

6. The switch of claim 1, wherein the virtual IP address is further associated with a remote switch, wherein the remote switch operates as a tunnel gateway and is associated with the virtual tunnel gateway.

7. The switch of claim 1,
wherein the packet processor is further configurable to:
encapsulate the data packet in an encapsulation packet; and
including a virtual switch identifier as an ingress switch identifier of the encapsulation packet; and
wherein the switch identifier is associated with the switch.

8. The switch of claim 1, further comprising a switch management module configurable to maintain a membership in a network of interconnected switches.

9. The switch of claim 8, wherein the packet processor is further configurable to identify the inner packet to be a broadcast, unknown unicast, or multicast packet; and
wherein the tunnel management module is further configurable to select a multicast tree in the network to distribute the inner packet based on one or more of: multicast group membership, virtual local area network (VLAN) membership, and network load.

10. The switch of claim 8, wherein the virtual tunnel gateway appears as a member switch of the network.

11. The switch of claim 1, wherein the packet processor is further configurable to construct an Address Resolution Protocol (ARP) response message comprising a virtual MAC address associated with the switch in response to an ARP query message for the virtual IP address.

12. A computer-executable method, comprising:
operating a switch as a tunnel gateway capable of terminating an overlay tunnel;
learning a MAC address of a virtual machine via a tunnel initiated by a first hypervisor associated with the virtual machine;
constructing a message for a second hypervisor comprising an Internet Protocol (IP) address of the first hypervisor in response to receiving a data frame with unknown destination from a virtual machine associated with the second hypervisor; and
identifying in a data packet a virtual IP address associated with a virtual tunnel gateway, wherein the virtual tunnel gateway is associated with the switch; and
determining an output port for an inner packet in the data packet based on a destination address of the inner packet.

13. The method of claim 12, further comprising identifying a hypervisor controlling a virtual machine, wherein the virtual machine initiates the overlay tunnel by encapsulating the inner packet using the virtual IP address.

14. The method of claim 12, further comprising identifying in the data packet a virtual media access control (MAC) address corresponding to the virtual IP address.

15. The method of claim 12, further comprising generating a configuration message comprising the virtual IP address as a tunnel gateway address in response to detecting a hypervisor.

16. The method of claim 15, wherein the virtual IP address in the configuration message corresponds to a default gateway router.

17. The method of claim 12, wherein the virtual IP address is further associated with a remote switch, wherein the remote switch operates as a tunnel gateway and is associated with the virtual tunnel gateway.

18. The method of claim 12, further comprising:
encapsulating the data packet in an encapsulation packet; and
identifying a virtual switch identifier as an ingress switch identifier of the encapsulation packet; and
wherein the virtual switch identifier is associated with the switch.

19. The method of claim 12, further comprising maintaining a membership in a network of interconnected switches.

20. The method of claim 19, further comprising:
identifying the inner packet to be a broadcast, unknown unicast, or multicast packet; and
selecting a multicast tree in the network to distribute the inner packet based on one or more of: multicast group membership, virtual local area network (VLAN) membership, and network load.

21. The method of claim 19, wherein the virtual tunnel gateway appears as a member switch of the network.

22. The method of claim 12, further comprising constructing an Address Resolution Protocol (ARP) response message comprising a virtual MAC address associated with the switch in response to an ARP query message for the virtual IP address.

* * * * *